US012621541B2

(12) United States Patent (10) Patent No.: US 12,621,541 B2
Hurley et al. (45) Date of Patent: May 5, 2026

(54) GENERATING A COLLABORATIVE INTERLEAVED CONTENT SERIES

(71) Applicant: EyeTell, Inc., Atherton, CA (US)

(72) Inventors: Brent Hurley, Atherton, CA (US);
Chad Hurley, Atherton, CA (US);
Raina Plom, Atherton, CA (US); Reed Martin, San Francisco, CA (US)

(73) Assignee: EyeTell, Inc., Atherton, CA (US)

( * ) Notice: Subject to any disclaimer, the term of this patent is extended or adjusted under 35 U.S.C. 154(b) by 0 days.

(21) Appl. No.: 19/233,840

(22) Filed: Jun. 10, 2025

(65) Prior Publication Data

US 2025/0380035 A1 Dec. 11, 2025

Related U.S. Application Data

(60) Provisional application No. 63/658,383, filed on Jun. 10, 2024.

(51) Int. Cl.
*H04N 21/81* (2011.01)
*G06F 16/3329* (2025.01)
*G10L 13/08* (2013.01)
*H04N 21/845* (2011.01)

(52) U.S. Cl.
CPC ... *H04N 21/8133* (2013.01); *G06F 16/33295* (2025.01); *G10L 13/08* (2013.01); *H04N 21/845* (2013.01)

(58) Field of Classification Search
CPC .............. H04N 21/8133; H04N 21/845; G06F 16/33295; G10L 13/08
See application file for complete search history.

(56) References Cited

U.S. PATENT DOCUMENTS

| | | | |
|---|---|---|---|
| 11,995,120 B1 | 5/2024 | Kirke | |
| 2008/0244038 A1 | 10/2008 | Martinez | |
| 2020/0372524 A1 | 11/2020 | Srivastava et al. | |
| 2021/0056376 A1 | 2/2021 | Panayiotou et al. | |
| 2021/0352380 A1 | 11/2021 | Duncan et al. | |
| 2021/0390314 A1 | 12/2021 | Baijal et al. | |
| 2023/0027035 A1* | 1/2023 | Gagliano ............. | G11B 27/031 |

(Continued)

OTHER PUBLICATIONS

Patent Cooperation Treaty, International Search Report and Written Opinion, PCT Patent Application No. PCT/US2025/033062, Oct. 7, 2025, 45 pages.

(Continued)

*Primary Examiner* — Sumaiya A Chowdhury
(74) *Attorney, Agent, or Firm* — Fenwick & West LLP

(57) ABSTRACT

A collaborative content generation system uses machine learning to generate a script and content depicting the performance of the script. A director may use the system to generate the script and optionally, may involve one or more collaborators who perform portions of the script. The system may use machine learning to generate or modify a script, a storyboard to visualize the story, a narrator (e.g., the narrator's voice), characters, music, sound effects, etc. A director may assign portions of the script to certain collaborators and select which of their recordings are interleaved into the final collaborative interleaved content series. The collaborators may independently perform their portions and provide clips of their performances to the system, which may then interleave the clips to produce the finalized content.

18 Claims, 11 Drawing Sheets

(56) References Cited

U.S. PATENT DOCUMENTS

| | | | |
|---|---|---|---|
| 2025/0232506 A1* | 7/2025 | Yi | G06T 13/40 |
| 2025/0247570 A1* | 7/2025 | Kalish | H04N 21/2343 |
| 2025/0316010 A1* | 10/2025 | Geisler | H04N 21/854 |

OTHER PUBLICATIONS

Tian et al., "A System for Interleaving Discussion and Summarization in Online Collaboration", ACM, Dec. 2020, retrieved on [Dec. 8, 2025]. Retrieved from the internet <URL: https://dl.acm.org/doi/pdf/10.1145/3432940> entire document.

* cited by examiner

Generate script and digital makeup
706

CICS Generation at Collaborative Content
Generation System

GENERATING A COLLABORATIVE INTERLEAVED CONTENT SERIES

CROSS-REFERENCE TO RELATED APPLICATIONS

This application claims the benefit of U.S. Provisional Application No. 63/658,383, filed Jun. 10, 2024, which is incorporated by reference in its entirety.

TECHNICAL FIELD

The disclosure generally relates to digital media generation, and more specifically to generating collaborative, interleaved content series using machine learning.

BACKGROUND

The widespread accessibility of cameras and microphones has greatly increased content production. Anyone with a smartphone can become a director or actor. While the number of directors and actors have increased, conventional media generation systems targeted at home users lack tools that the traditional production studios possess. One conventional media generation system allows a user to record their own video of a movie scene and dub over the original actor's line while another conventional system facilitates karaoke for an existing song. Because these conventional systems lack sufficient content collaboration and production tools, they leave minimal room for the users to engage with the technology to have creative direction over the content they generate. Additionally, these conventional systems rely on existing content without user customization to create unique content.

SUMMARY

In some aspects, the techniques described herein relate to a non-transitory computer-readable medium including instructions, the instructions, when executed by a computer system, causing the computer system to perform operations including: accessing a structure parameter characterizing a genre of content; accessing descriptive parameters characterizing a plot of the content; generating a first prompt for a first machine learning model to request a script for the content, the first prompt specifying the accessed structure parameter and descriptive parameters, wherein the first prompt further requests character descriptions for characters in the script, dialogue for the characters, and one or more transition scene descriptions; receiving, as an output from the first machine learning model, the script, wherein the script includes the dialogue for the characters and the one or more transition scene descriptions; generating a second prompt for a second machine learning model to request digital augmentation for the characters, wherein the digital augmentation includes one or more of a visual or audio enhancement; receiving as an output from the second machine learning model, the digital augmentation; and transmitting the script and the digital augmentation to at least one client device.

In some aspects, the techniques described herein relate to a non-transitory computer-readable medium, the operations further including: classifying, using a third machine learning model trained using previously generated scripts and corresponding parameters used to generate the previously generated scripts, the accessed structure parameter and the accessed descriptive parameters as sufficient to generate the prompt for the first machine learning model to request the script for the content.

In some aspects, the techniques described herein relate to a non-transitory computer-readable medium, the operations further including: generating a third prompt for the second machine learning model to request a sound effect for the content, wherein the third prompt includes at least a portion of the script in which the requested sound effect is featured.

In some aspects, the techniques described herein relate to a non-transitory computer-readable medium, the operations further including: receiving audio of a user reading aloud the portion of the script; and detecting a manually produced sound effect in the audio; wherein the third prompt includes an instruction that the requested sound effect be based on the manually produced sound effect.

In some aspects, the techniques described herein relate to a non-transitory computer-readable medium, wherein the output from the second machine learning model is a first output of the second machine learning model, the operations further including: receiving a shared video and a prior prompt used to generate the shared video; modifying the second prompt using the prior prompt, wherein the modified second prompt requests an updated digital augmentation for one of the characters to have an appearance of a character in the shared video; and receiving as a second output from the second machine learning model, the updated digital augmentation.

In some aspects, the techniques described herein relate to a non-transitory computer-readable medium, the operations further including: generating a third prompt for a third machine learning model to request storyboard images, the third prompt specifying the character descriptions for characters in the script and the one or more transition scene descriptions; receiving, as an output from the third machine learning model, the storyboard images; and causing the storyboard images and corresponding dialogue for the characters to be displayed.

In some aspects, the techniques described herein relate to a non-transitory computer-readable medium, the operations further including: receiving, from a client device of the at least one client device, a selection one of the storyboard images; and causing a portion of the third prompt to be displayed, wherein the portion of the third prompt caused the third machine learning model to generate the selected storyboard image.

In some aspects, the techniques described herein relate to a non-transitory computer-readable medium, the operations further including: receiving a reference image of a desired character of the characters; and providing the second prompt and the reference image to the second machine learning model; wherein the digital augmentation received as the output from the second machine learning model includes an appearance of the desired character that is based upon the reference image.

In some aspects, the techniques described herein relate to a non-transitory computer-readable medium, the operations further including: receiving cinematography instructions including a desired camera angle for depicting at least one of the characters, wherein the first prompt for the first machine learning model further requests a scene of the content be captured at the desired camera angle.

In some aspects, the techniques described herein relate to a non-transitory computer-readable medium, wherein the digital augmentation for the characters requested in the second prompt includes an audio enhancement to a voice associated with a line of the script.

In some aspects, the techniques described herein relate to a non-transitory computer-readable medium, wherein the voice is a voice of a computer-generated narrator.

In some aspects, the techniques described herein relate to a non-transitory computer-readable medium, wherein the voice is a voice of a collaborator.

In some aspects, the techniques described herein relate to a non-transitory computer-readable medium, the operations further including: receiving a recording created at a collaborator client device, wherein the one or more of a visual or audio enhancement is applied to the recording created at the collaborator client device.

In some aspects, the techniques described herein relate to a system including: a computer system; and a non-transitory computer-readable medium including instructions, the instructions, when executed by the computer system, causing the computer system to perform operations including: accessing a structure parameter characterizing a genre of content; accessing descriptive parameters characterizing a plot of the content; generating a prompt for a first machine learning model to request a script for the content, the prompt specifying the accessed structure parameter and descriptive parameters, wherein the prompt further requests character descriptions for characters in the script, dialogue for the characters, and one or more transition scene descriptions; receiving, as an output from the first machine learning model, the script, wherein the script includes the dialogue for the characters and the one or more transition scene descriptions; generating a prompt for a second machine learning model to request digital augmentation for the characters; receiving as an output from the second machine learning model, the digital augmentation; and transmitting the script and the digital augmentation to at least one client device.

In some aspects, the techniques described herein relate to a system, wherein the output from the second machine learning model is a first output of the second machine learning model, the operations further including: receiving a shared video and a prior prompt used to generate the shared video; modifying the second prompt using the prior prompt, wherein the modified second prompt requests an updated digital augmentation for one of the characters to have an appearance of a character in the shared video; and receiving as a second output from the second machine learning model, the updated digital augmentation.

In some aspects, the techniques described herein relate to a method including: accessing staffing instructions for a script; transmitting the script to collaborator client devices, wherein the transmitted script appears at the collaborator client devices with respective visual indicators indicating which portions of the script are assigned to a corresponding collaborator; receiving, from the collaborator client devices, recordings of collaborators performing the respective portions of the script, wherein the recordings include an overlay of digital augmentation generated using a first machine learning model trained to generate the digital augmentation based on the script; and interleaving the recordings into a collaborative interleaved content series for transmission to a viewer client device.

In some aspects, the techniques described herein relate to a method, further including: accessing collaborator characteristics; applying the collaborator characteristics to a second machine learning model, the second machine learning model trained to determine a likelihood that a given collaborator is suited to perform a character in the script; and determining the staffing instructions for the script based on the output of the second machine learning model.

In some aspects, the techniques described herein relate to a method, further including: accessing an external database of actor characteristics, the actor characteristics describing one or more of physical appearances of actors or filmography of the actors; accessing an external database of scripts, the actors assigned to characters in the scripts; creating a training set based on the actor characteristics and the scripts; and training the second machine learning model using the training set.

In some aspects, the techniques described herein relate to a method, further including: generating recommendations for editing the recordings using a third machine learning model trained to determine a likelihood that the recordings satisfy preferences of a director; and generate an alternative version of one of the recordings using a diffusion model.

In some aspects, the techniques described herein relate to a method, further including: receiving an image from a collaborator client device, the image depicting an environment surrounding the collaborator client device; and generating a prompt for a generative AI video model to request a non-collaborator video clip based on the script and the image, wherein the non-collaborator video clip depicts the environment.

BRIEF DESCRIPTION OF THE DRAWINGS

The disclosed embodiments have other advantages and features which will be more readily apparent from the detailed description, the appended claims, and the accompanying figures. A brief introduction of the figures is below.

DETAILED DESCRIPTION

Figure 1:
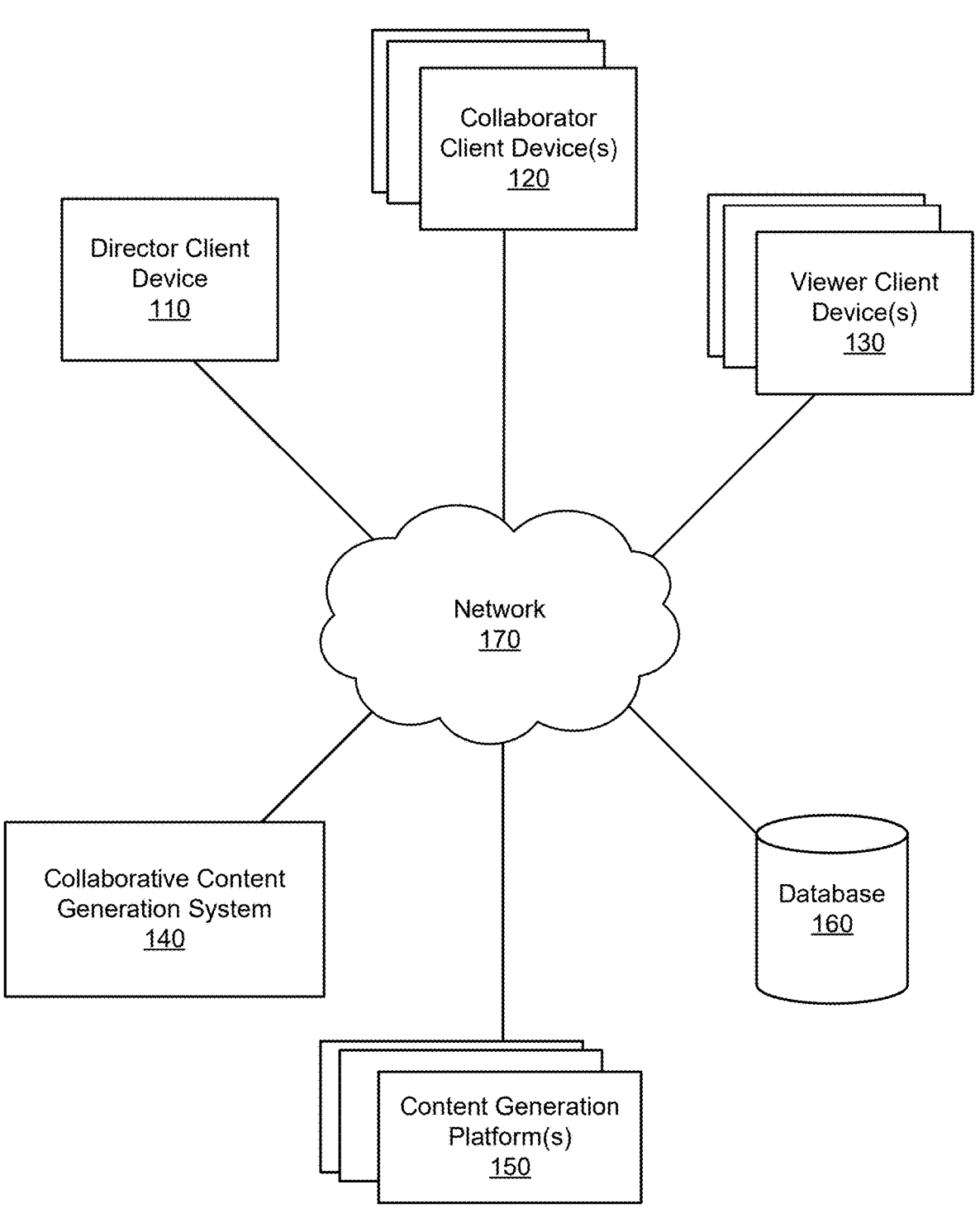
FIG. 1 illustrates a collaborative content generation system environment, in accordance with one embodiment.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Introduction

Social media and content creation platforms have become ubiquitous in modern digital communication. These platforms allow individuals to share various types of content including videos, images, text, and interactive media. As these platforms have evolved, there has been a growing interest in collaborative content creation where multiple individuals contribute to a single piece of content.

Existing approaches to collaborative content creation may include manual coordination between contributors, where individuals may independently create content segments that are later assembled by a coordinator. This process may be time-consuming and may lack cohesiveness in the final product. Some platforms may provide rudimentary tools for content collaboration, but these tools may be limited in their ability to guide collaborators or ensure consistency across contributions.

Traditional video production typically requires substantial resources, including specialized equipment, technical expertise, and coordination among multiple parties. This may create barriers to entry for casual content creators or small organizations wishing to produce professional-quality collaborative content. Moreover, achieving visual and thematic consistency across multiple contributors may present challenges when collaborators are geographically dispersed or have varying levels of technical capability.

Some existing systems may allow for basic content sharing and sequential editing, but may lack sophisticated mechanisms for script generation, standardized visual presentations, or efficient interleaving of content from multiple sources. Furthermore, current platforms may not adequately address the need for digital augmentation or enhancement of contributor content to maintain consistent quality and appearance across different recording environments.

The collaborative interleaved content system may utilize machine learning models to enhance the generation of collaborative content by ensuring consistency between content produced from different sources. For instance, the system may employ generative models to adjust the tonal characteristics of a series of videos, rendering them with a cohesive gothic ambiance. Regardless of the original lighting, color schemes, or thematic elements present in the diverse source materials, the machine learning models can analyze these parameters and apply modifications to unify them under a gothic theme. This may involve adjusting color gradients to darker hues, incorporating gothic music overlays, and applying video effects that emphasize shadow and texture, resulting in a visually and thematically consistent series across all contributor inputs.

The system described herein offers mechanisms to perform content modifications that would be challenging to accomplish manually within traditional time constraints. In some embodiments, the system utilizes advanced computational capabilities to enable content creators to implement these modifications efficiently and at a reduced cost. This capability supports the achievement of consistent aesthetic or thematic uniformity across varied contributor inputs. The system therefore mitigates the need for extensive expenditures typically required to maintain such cohesion. Content alterations may include color correction, lighting adjustments, background consistency, and auditory enhancements, among others. These alterations are performed using machine learning models that predict and apply the necessary enhancements to achieve visual and thematic consistency between segments. Additionally, in some embodiments, users can customize these alterations according to specific preferences, accommodating a wide range of creative visions while maintaining the desired uniformity across the final collaborative content.

The content generation system improves upon traditional foundational model approaches by addressing the challenge of maintaining consistent context across different portions of a content series. This enhancement is achieved without the necessity of repeatedly invoking the models, thereby optimizing computational efficiency. The system generates a storyboard that includes images, text, dialogue, and an outline, which serves as a preliminary representation of the intended content. The storyboard acts as a scaffolding that guides the development of the content, helping to align the creative inputs with the desired narrative structure and thematic elements. In some embodiments, the fidelity of the storyboard may be less detailed compared to the final version, allowing for iterative refinement and fine-tuning as the content approaches completion. This approach integrates machine learning capabilities with traditional storytelling techniques to streamline production workflows, reduce computational overhead, and enhance collaborative content creation processes. By leveraging these techniques, the system facilitates the production of coherent and engaging content while enabling higher efficiency and consistency throughout the creative process.

To expand, the creators and/or director may have the capability to refine the lower fidelity content to enhance consistency across various segments. This process includes introducing appropriate content tailored to specific scenes (e.g., by applying augmentations) and making suitable adjustments to the narrative to enable a cohesive final product. The use of a storyboard format, as opposed to fully rendered video or images, allows for a reduction in computational resource consumption. This approach facilitates preliminary edits while maintaining focus on narrative flow and thematic alignment without the overhead of processing high-resolution media. Once this storyboard process reaches a completed state, there is an opportunity to render the content at full quality. This transition from lower fidelity to high fidelity allows for detailed visual and auditory enhancements, allowing the final output to meet professional standards and fulfill creative objectives.

Configuration Overview

A collaborative content generation system uses machine learning to generate a script and content depicting the performance of the script. The content is a collaborative work between a director who uses the system to generate the script and one or more collaborators who perform portions of the script. The collaborators may independently perform their portions and provide clips of their performances to the system, which then interleaves the clips to produce the finalized content. Accordingly, the content may be referred to as a collaborative interleaved content series, or "CICS." The system also uses machine learning to generate digital makeup enhancing the collaborators' performances. For example, digital makeup may include an overlay of digital costumes or cosmetics onto the video recording of the collaborator reading their lines. In another example, digital makeup can include an audio filter applied to the collaborator's vocals to modify the way they sound. A director may assign portions of the script to certain collaborators and select which of their recordings are interleaved into the final CICS.

The collaborative content generation system described herein offers a comprehensive suite of tools for generating storytelling content from script writing, actor casting, costume creation, video and/or audio editing, and selection of actors' performances for the finalized production. The collaborative content generation system enables users to customize steps of the production process. For example, a user serving as the director can use the system to customize a script, generate digital makeup that is tailored to the characters created in the script and/or the chosen collaborators, and receive recommendations for editing the content based on their preferences or contextual parameters. The comprehensive tool suite, automation, and customization features provides benefits over the limited tools and pre-determined, non-customized content.

Collaborative Content Generation System Environment

FIG. 1 illustrates a collaborative content generation system environment, in accordance with one embodiment. The collaborative content generation (CCG) system environment may be a video editing system, audio recording system, or any suitable media creation system that enables a user to generate, edit, and/or view media content. The illustrated system environment includes a director client device 110, one or more collaborator client devices 120, one or more viewer client devices 130, a CCG system 140, one or more content generation platforms 150, a database 160, and a network 170. The CCG system 140, in some example embodiments, may include the content generation platform(s) 150 and/or the database 160. In other example embodiments, the CCG system 140 may include one or more of the client devices 110, 120, and/or 130, such that the CCG system 140 is an all-in-one system rather than multiple devices or servers that are communicatively coupled (e.g., wireless communication).

Users of the collaborative content generation system 140 may have roles including, for example, directors, collaborators, and viewers. Users interact with the CCG system 140 using client devices. Examples of client devices include mobile devices, tablets, laptop computers, desktop computers, gaming consoles, or other network-enabled computer devices. Although the director client device 110, collaborator client device(s) 120, and the viewer client device(s) 130 are depicted as separate client devices, one single client device may be used by various types of users (e.g., different users logged into their respective accounts on the client application on the single client device).

While the collaborative content generation system 140 is advantageous for generating collaborative content among two or more collaborators under the director's supervision, the collaborative content generation system 140 may also be used for generating non-collaborative content (e.g., a one-person play, a soliloquy, or a monologue). The collaborative content generation system 140 may also be used to generate non-collaborative content that could be made collaborative. For example, the collaborative content generation system 140 generates a story having two or more characters, where the user has either their voice or a computer-automated voice provide audio for lines of dialogue generated by the system 140. In this example, the collaborative content generation system 140 may allow for a collaborator to join flexibly when the collaborator is available, replacing a computer-automated voice with the collaborator's voice.

The content may include concatenated portions of shorter content (e.g., a video may be a compilation of several video clips or an audiobook may be a compilation of several audio clips). The content may include an audio and/or video component(s). The content may be a combination of recorded audio or video (e.g., human audio, video of a real environment, or any suitable audio, image, or video capture of naturally occurring environments) and artificially generated recordings (e.g., sound and video generated by a generative artificial intelligence model based on a prompt generated by the collaborative content generation system 140). The director may use the director client device 110 to generate a script for the content and/or arrange the content after receiving portions of content (e.g., recorded readings of the script from collaborators). A script may refer to the text of a play, movie, audiobook, broadcast, any suitable audio and/or video media, or a combination thereof.

The director client device 110 is a client device used by a director who manages the production of content through the collaborative content generation system 140. The director client device 110 may communicate directly or indirectly (i.e., through the collaborative content generation system 140) with the collaborative client device(s) 120 and/or the viewer client device(s) 130. In some embodiments, the director client device 110 executes a CCG client application that uses an application programming interface (API) to communicate with the collaborative content generation system 140. The CCG client application may be an extension of the CCG system 140 such that a client device may access and/or perform the functionalities of the CCG system 140.

A director uses the director client device 110 to initiate and manage the production of content (e.g., a video, audiobook, soundtrack, or any suitable audio and/or video media product) via the collaborative content generation system 140. The director may use the client device 110 to edit or tune parameters that the collaborative content generation system 140 uses to generate a prompt for a content generation platform 150. Parameters can include a structure parameter and/or descriptive parameters. A structure parameter refers to a genre or any suitable categorization of the story the director desires to tell. Descriptive parameters refer to the plot, characters, setting, background music, lighting, theme, message, any suitable descriptive characteristic of the story and/or cinematography, or a combination thereof.

Figures 5A, 5B:
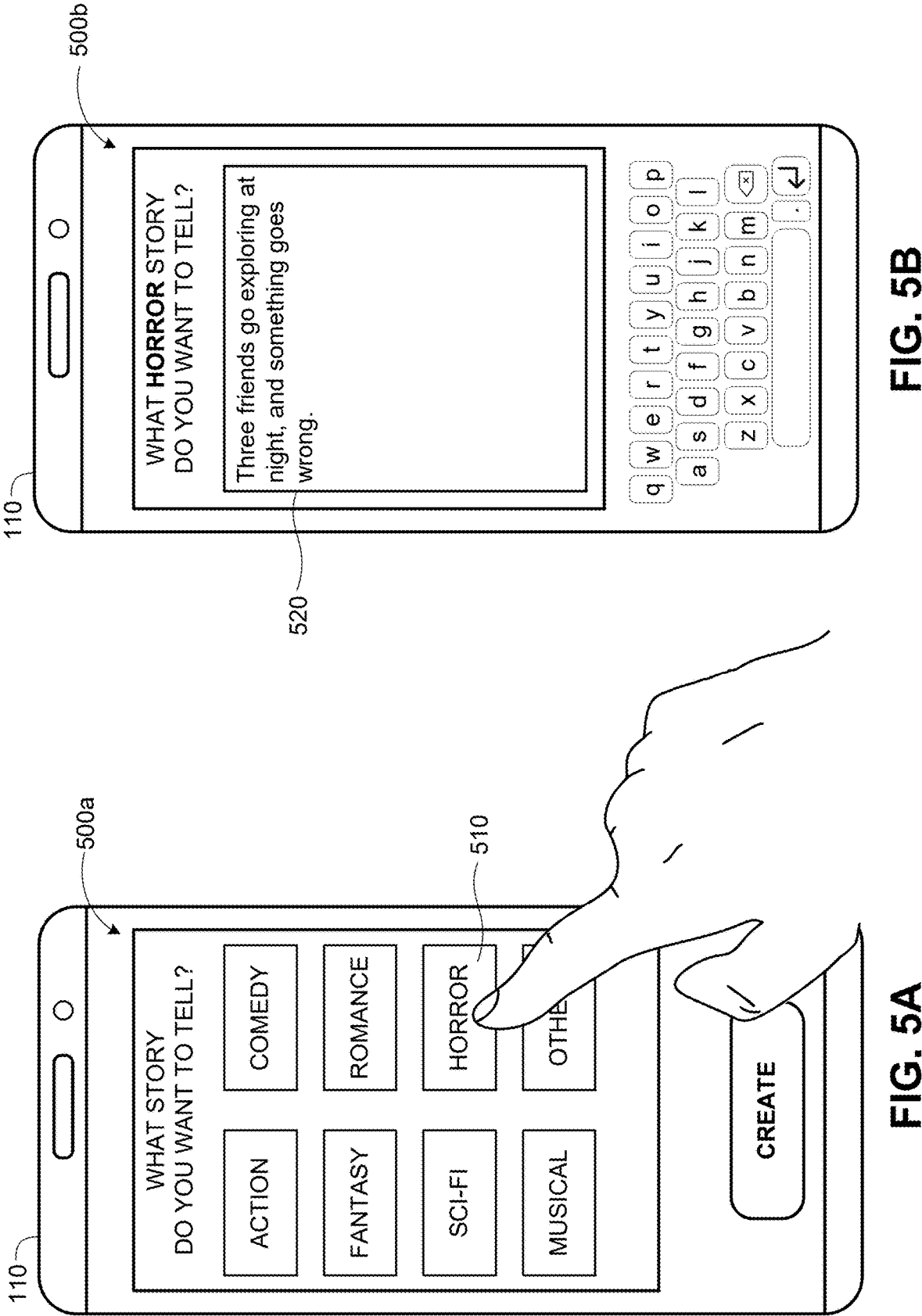
FIGS. 5A and 5B illustrate an example process and user interfaces for generating a script based on user-provided parameters, in accordance with one embodiment.

One example of using the director client device 110 to tune parameters for generation of a script is shown in FIGS. 5A and 5B. In another example of tuning parameters for the generation of a script, the director may initially provide structure and descriptive parameters to the collaborative content generation system 140 and receive, at the director client device 110, instructions from the collaborative content generation system 140 to be more specific with the descriptive parameters previously provided. The collaborative content generation system 140 may use a content generation platform 150 to request instructions that would likely cause the director to provide more specific instructions.

The director may use the director client device 110 to customize and finalize the content generated using the collaborative content generation system 140. After collaborators have finished recording their portions of the script, the director may use the director client device 110 to select which recordings are used in the finalized content (e.g., the collaborator has recorded several versions of the same portion of script, and the director is selecting from among those versions), edit the recordings (e.g., image processing filters, audio filters, etc.), add new recordings (e.g., instruct the collaborative content generation system 140 to generate a transition scene between two collaborators' recordings and insert the generated transition scene), re-assign collaborators to portions of script, any suitable modification of the audio and/or video content generated based on the script, or a combination thereof. The finalized content generated by the CCG system 140 may be referred to as a collaborative interleaved content series, (CICS).

The collaborator client device(s) 120 are client devices used by collaborators who contribute to the production of content through the collaborative content generation system 140. The collaborator client device 120 may communicate directly or indirectly (i.e., through the collaborative content generation system 140) with the director client device 110 and/or the viewer client device(s) 130. In some embodiments, the collaborator client device 120 executes a CCG client application that uses an application programming interface (API) to communicate with the collaborative content generation system 140.

Figures 6A, 6B:
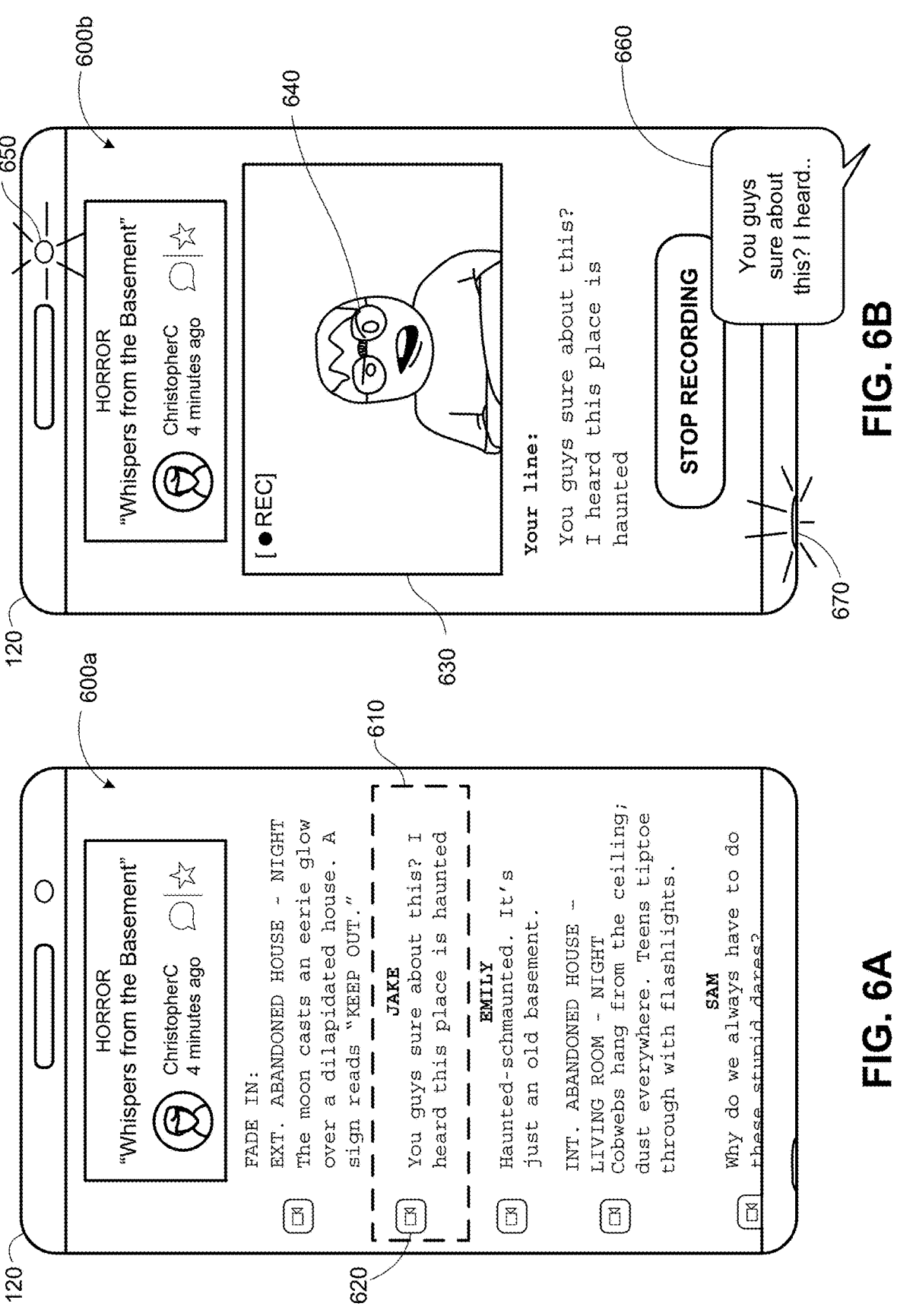
FIGS. 6A and 6B illustrate an example process and user interfaces for generating a video clip of content based on a generated script, in accordance with one embodiment.

A collaborator uses the collaborator client device 120 to generate one or more portions of content that a director will arrange for the finalized content generated by the collaborative content generation system 140. The collaborator may receive a script generated by the collaborative content generation system 140 and an assignment of the portions of the script that they are responsible for reading. The collaborator may use a display on the collaborator client device 120 to view the script, a microphone on the collaborator client device 120 to record the audio of their portion of the script, and a camera on the collaborator client device 120 to record the video of their portion of the script. One example of the collaborator client device 120 used to generate a portion of content is shown in FIGS. 6A and 6B.

A collaborator may use the collaborator client device 120 to communicate with the director and modify their generated portions of content. For example, the collaborator client device 120 may record a video of the collaborator's delivery of a portion of the script and transmit the video recording to the director client device 110. The collaborator client device 120 may then receive feedback from the director client device 110 instructing the collaborator to modify their delivery (e.g., "say the line in a whisper" or "make an angrier expression as you look off-camera").

The collaborator may use the collaborator client device 120 to view the digital makeup overlaid onto a real-time video or pre-recorded video of the collaborator. Digital makeup, as referred to herein, is a digital augmentation of the audio or video of a user. Digital makeup may include a voice filter (e.g., autotune, accent or dialect augmentation, etc.) and/or an image/video filter (e.g., digitally rendered makeup, accessories, fantastical or cartoon makeup/costume, etc.). The digital makeup may be applied in real-time as the user is capturing their audio and/or video. Alternatively, or additionally, the digital makeup may be applied to a pre-recorded performance of the user. Optionally, the collaborator may use the collaborator client device 120 to generate or modify the digital makeup. The collaborator may provide instructions for the collaborative content generation system 140 to generate or modify the digital makeup. Alternatively, the collaborative content generation system 140 may automatically generate or modify digital makeup based on an image, video, and/or audio of the collaborator.

The collaborator client device 120 may transmit video or an image of the collaborator to the collaborative content generation system 140, which may apply a machine learning model to the image to generate one or more elements of digital makeup that is most likely to share characteristics with a character of the script or with the collaborator themselves (e.g., the collaborator has used an Old West accent and in response, the machine learning model determines a cowboy hat may likely suit the accent).

The viewer client device(s) 130 are client devices used by viewers who consume the content produced through the collaborative content generation system 140. The viewer client device 130 may communicate directly or indirectly (i.e., through the collaborative content generation system 140) with the director client device 110 and/or the collaborator client device(s) 120. In some embodiments, the viewer client device 130 executes a CCG client application that uses an application programming interface (API) to communicate with the collaborative content generation system 140. For example, the collaborative content generation system 140 may cause the content generated using a director's script and collaborator's recorded performances of the script to be displayed at the CCG client application of the viewer client device(s) 130.

The client devices 110, 120, and 130 have general and/or special purpose processors, memory, storage, networking components (either wired or wireless). The client devices 110, 120, and 130 may communicate over one or more communication connections (e.g., a wired connection such as ethernet or a wireless communication (e.g., Wi-Fi). One or more of the client devices 110, 120, and 130 may be mobile devices that can communicate via cellular signal (e.g., LTE, 5G, etc.), Bluetooth, any other wireless standard, or combination thereof, and may include a global positioning system (GPS). The client devices 110, 120, and 130 can store and execute a CCG client application that interfaces with the collaborative content generation system 140, the content generation platform(s) 150, the database 160, or a combination thereof. The client devices 110, 120, and 130 also include screens (e.g., a display) and a display driver to provide for display interfaces on the display associated with the CCG client. The client devices 110, 120, and 130 also include or may be capable of interfacing with sensors such as cameras and/or microphones. The cameras on each client device may capture forward and/or rear facing images and/or videos. In some embodiments, the client devices 110, 120, and 130 couples to the collaborative content generation system 140, which enables it to execute a content generation application (e.g., a CCG client).

The collaborative content generation system 140 generates content based on input from a director and one or more collaborators and machine learning models (e.g., generative artificial intelligence (AI)). The CCG system 140 can generate a script based on parameters provided by a director. The CCG system 140 can generate characters and their digital makeup based on the generated script, and/or the parameters provided by the director. Further, the CCG system 140 can assist in the finalization of the content based on collaborators' performances and director instructions. The collaborative content generation system 140 may comprise program code that executes functions as described herein. The collaborative content generation system 140 is described further with respect to FIG. 3.

The content generation platform(s) 150 includes one or more machine learning models for generating components of content (e.g., a script, cutaway scenes, digital makeup, etc.) and/or providing analytics to enhance the generation of content (e.g., recommendations for casting, script modifications, digital makeup modifications, etc.). The models can include large learning models (LLMs), generative models (e.g., diffusion models), classification models, deep neural networks, clustering models, any suitable trained model, or combination thereof.

The content generation platform 150 receives requests from the collaborative content generation system 140 to perform tasks using machine-learned models. The tasks include, but are not limited to, natural language processing (NLP) tasks, audio generation and/or processing tasks, image generation and/or processing tasks, video generation and/or processing tasks, and the like. In one or more embodiments, the machine-learned models deployed by the content generation platform 150 are models configured to perform one or more NLP tasks. The NLP tasks include, but are not limited to, text generation, query processing, machine translation, chatbots, and the like. In one or more embodiments, the language model is configured as a transformer neural network architecture. Specifically, the transformer model is coupled to receive sequential data tokenized into a sequence of input tokens and generates a sequence of output tokens depending on the task to be performed.

The content generation platform 150 receives a request including input data (e.g., text data, audio data, image data, or video data) and encodes the input data into a set of input tokens. The content generation platform 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represent a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are LLMs trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have significant number of parameters in a deep neural network (e.g., transformer architecture), for example, at least 1 billion, at least 15 billion, at least 135 billion, at least 175 billion, at least 500 billion, at least 1 trillion, or at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the collaborative content generation system 140 or one or more entities different from the collaborative content generation system 140. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

The content generation platform(s) 150 can include a diffusion model trained to create images based on one or more of an image or text description. In some embodiments, the diffusion model takes the text input (such as a sentence or a phrase) and/or an image feature input (such as color, depth, etc.), and generates an image that visually represents the content described in the inputs. The diffusion model can be trained to reverse the process of adding noise to an image. After training to convergence, the model can be used for image generation by starting with an image composed of random noise for the network to iteratively denoise.

The database 160 stores data used by the collaborative content generation system 140 to generate scripts, digital makeup, recommendations for content creation or modification, any suitable product of the CCG system 140, or combination thereof. The database 160 may store user profile information. For example, the database 160 may store a director's preferences for structure parameters and the collaborators with which they have worked. The database 160 may store digital makeup generated for content (e.g., for a sequel, prequel, or any other content related to an existing content produced using the CCG system 140). The database 160 may store content created by the CCG system 140. The database 160 may store user inputs for script generation (e.g., structure and descriptive parameters). The database 160 may store user inputs for collaborator assignments (e.g., which collaborator will perform which character in the script).

The network 170 transmits data between the client devices 110, 120, and 130, the CCG system 140, the content generation platform(s) 150, and the database 160. The network 170 may be a local area and/or wide area network that uses wired and/or wireless communication systems, such as the internet. In some embodiments, the network 170 includes encryption capabilities to ensure the security of data, such as secure sockets layer (SSL), transport layer security (TLS), virtual private networks (VPNs), internet protocol security (IPsec), etc.

Example Device, System, and Platform Configurations

Figure 2:
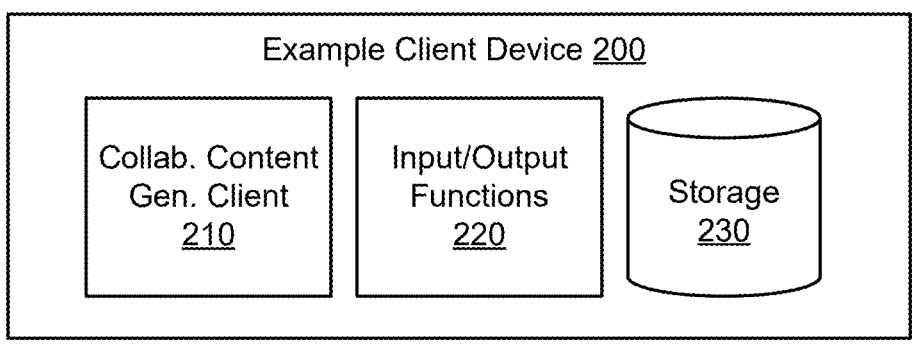
FIG. 2 is a block diagram of an example client device, in accordance with one embodiment.

FIG. 2 is a block diagram of an example client device 200, in accordance with one embodiment. The client device 200 may be the client devices 110, 120, and/or 130. The client device 200 includes a collaborative content generation (CCG) client 210, input and output functions 220, and storage 230. The CCG client 210 is an application used to access the services of the collaborative content generation system 140 when its services are located on a remote server. In some embodiments, some of the functions of the CCG system 140 may be executed locally on the client device 200. For example, the digital makeup may be overlaid onto video of a collaborator by the computer system of the collaborator client device 120. The input/output (I/O) functions 220 may include functions of sensors of the client device 200 (e.g., cameras, touchscreen displays, microphones, depth sensors, etc.). The storage 230 may store content created by the user of the client device 200 using the CCG system 140. In some embodiments, the client device 200 includes more, less, or different components than those shown in FIG. 2.

Figure 3:
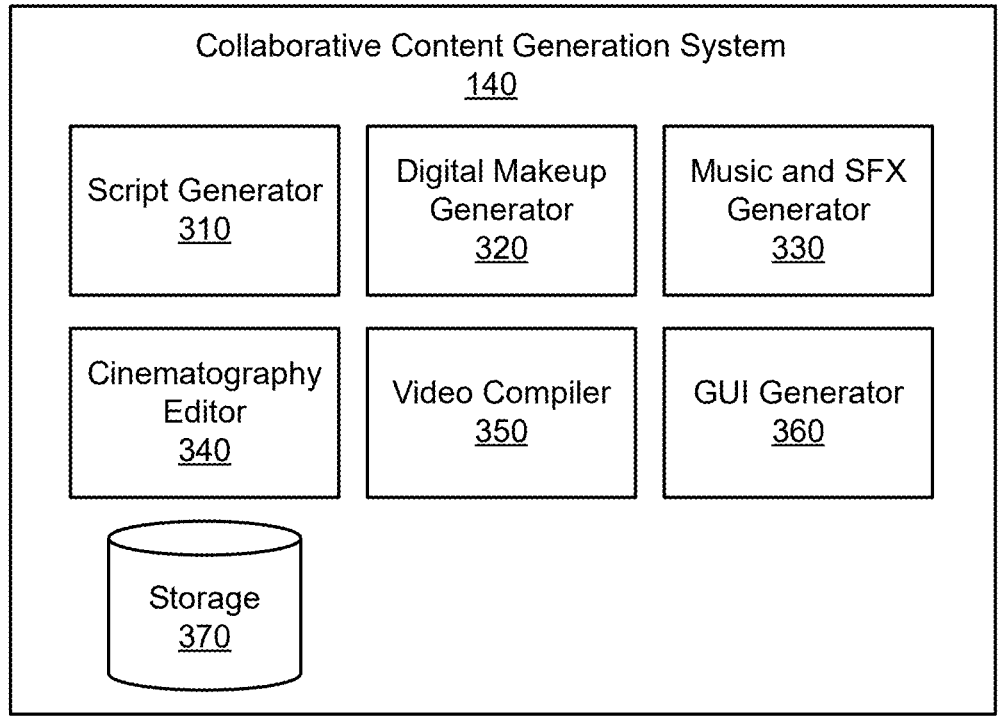
FIG. 3 is a block diagram of the collaborative content generation system of FIG. 1, in accordance with one embodiment.

FIG. 3 is a block diagram of the collaborative content generation system 140 of FIG. 1, in accordance with one embodiment. The collaborative content generation system 140 includes software modules such as a script generator 310, a digital makeup generator 320, a music and sound effect (SFX) generator 330, a cinematography editor 340, a video compiler 350, a graphical user interface (GUI) generation module 360, and a storage 370. In some embodiments, the CCG system 140 includes modules other than those shown in FIG. 3. For example, the CCG system 140 may include a machine learning model trained to generate recommendations of transition shots for the director. The modules may be embodied as program code (e.g., software comprised of instructions stored on non-transitory computer readable storage medium and executable by at least one processor such as the processor 1102 in FIG. 11) and/or hardware (e.g., application specific integrated circuit (ASIC) chips or field programmable gate arrays (FPGA) with firmware. The modules correspond to at least having the functionality described when executed/operated.

The script generator 310 generates a script using machine learning based on parameters describing the script. Parameters include a structure parameter and one or more descriptive parameters. The script generator 310 can receive the parameters from users (e.g., the director via a director client device). The script generator 310 generates a prompt for a machine learning model (e.g., an LLM) to request a script or a portion of a script (e.g., the ending of a screenplay). The script generator 310 obtains a response from the machine learning model, where the response includes an entire script or a portion thereof. For example, the response can include dialogue for the one or more collaborators, descriptions of the scene in which the dialogue is taking place, chapters organizing the dialogue and descriptions, descriptions of the characters to be portrayed by the one or more collaborators, etc. The script generator 310 may recommend casting assignments for pairing collaborators to characters in the generated script.

The script generator 310 generates a prompt that specifies a request and context for input to the content generation platform 150. The request may include user-provided data specific to the present script generation request (e.g., the structure parameter and descriptive parameters). The task of the script generator 310 for the content generation platform(s) 150 may include one or more to perform question-answering, text summarization, text generation, and the like.

The script generator 310 may generate a prompt by populating a pre-structured prompt with parameters. The pre-structured prompt may be a whole or portion of a prompt input to a machine learning model of the content generation platform 150. Each structured prompt may be associated with a specific type of parameter (e.g., the structure parameter). One example of a pre-structured prompt may be "Write a script for a [structure_parameter] movie," where the bracketed "structure_parameter" is a placeholder where the script generator 310 would populate the value of the structure parameter that a director specifies. Another example of a pre-structured prompt may be "Write a script for a [structure_parameter] movie, where [character1] [character1_action] [character2] at [location]" where "character1," "character1_action," "character2," and "location" are descriptive parameters provided by the director.

Context used by the script generator 310 includes user data, external content data, internal content data, environmental data, any suitable contextual data related to the user's script request, or a combination thereof. User data includes biographic data about the user (e.g., user's age and occupation), user preferences (e.g., user's favorite director, actors, genres of movies, etc.) the CCG system 140 use history of the user or similar users (e.g., the frequency with which the user uses the CCG system 140, the length of communications that the user has had with the script generator 310's automatic dialogue prompting to generate a script, the feedback that the user has provided regarding the CCG system 140, the duration of content created by users having similar user preferences, etc.), any suitable data regarding the user, or a combination thereof.

External content data includes information about content (e.g., existing scripts, audio, filming locations, etc.), directors (e.g., directors in the movie industry), actors, producers, any suitable data regarding content that is created outside of the CCG system 140, or a combination thereof. Internal content data includes information about scripts created by the CCG system 140, collaborators using the CCG system 140 (e.g., a directory of collaborators available to participate in new content), directors using the CCG system 140, analytics of creation data (e.g., the popularity of horror scripts being generated), any suitable data regarding content created using the CCG system 140, or a combination thereof. Environmental data includes a present location of users, a present time of users, current events (e.g., newsworthy events), any suitable data regarding the environment in which the user is located as the user interacts with the CCG system 140, or a combination thereof.

In some embodiments, the user may provide a script or a portion of a script to the script generator 310, and in response, the script generator 310 recommends modifications and/or a completed script. For example, the script generator 310 may receive a portion of an existing movie script as part of the descriptive parameters input by the director, generate a prompt including the portion of the existing movie script, and receive from the content generation platform 150 a script having shared characteristics with the existing movie script.

In some embodiments, the script generator 310 may generate recommendations for assigning characters to collaborators. The script generator 310 may identify information about collaborators (e.g., biographical information, physical description, past performances, etc.) and apply the information to a machine learning model trained to determine a likelihood that the collaborator is compatible with the character role. The machine learning model may be referred to as a casting model. The casting model may be trained on mappings of existing character descriptions to descriptions of the actors who played them, where the casting model determines the likelihood of compatibility based on a comparison of the actor to the collaborator and the existing character to the generated character.

The digital makeup generator 320 generates digital makeup for enhancing an image or video of a user. The digital makeup generator 320 receives a text-based, image-based, and/or audio-based input (e.g., from the director client device and/or the script generator 310) and generates a prompt for the content generation platform(s) 150. The digital makeup generator 320 receives a text-based, image-based, and/or audio-based output from the content generation platform 150, where the output describes a character in the script of content (e.g., a script generated by the script generator 310 or a pre-written script provided by the director). For example, the digital makeup generator 320 may receive at least a portion of a script including character dialogue and/or description (i.e., text-based input) and an image of the collaborator that the director intends to play the character (i.e., image-based input), generate a prompt including the inputs for the content generation platform 150, and receive from the content generation platform 150 digital makeup (e.g., a text-based description of the digital makeup or images of the digital makeup).

In some embodiments, the digital makeup generator 320 may provide to the content generation platform 150 the inputs describing the character and recorded portions of the script that the collaborator has performed and provided to the CCG system 140, generate a prompt including these inputs for the content generation platform 150, and receive from the content generation platform 150 an augmented version of the recorded portions of the script that are enhanced by digital makeup. For example, the digital makeup generator 320 provides the script and readings of the script to the content generation platform 150, generates a prompt including at least a portion of the script describing a character from Australia and the recorded portions of the character's lines, and receives from the content generation platform 150 the recorded portions of the script that enhance the collaborator's voice to have an Australian accent.

Digital makeup may include modifying a portion of an image, audio, and/or video (e.g., a subset of the pixels of the video is altered to overlay a pair of digitally rendered glasses onto the video of the collaborator). Digital makeup may include modifying the entirety of an image, video, and/or audio (e.g., applying an audio filter that changes the pitch of a collaborator's voice). Although the term "makeup" is used, digital makeup is not limited to cosmetic augmentation of a user's appearance. Examples of digital makeup modifying an image or video include adding or removing objects or accessories that a collaborator is written, according to the script, to be in contact with (e.g., adding a hat on the collaborator's head or a sword in the user's hand), applying cosmetic enhancements, modifying hairstyles, modifying skin features (e.g., adding a scar or a tattoo), any suitable alteration to the collaborator's appearance, or combination thereof. Examples of digital makeup modifying audio include changing the pitch of the collaborator's audio to make their voice belong to a different age group, applying pitch correction for singing, generating their voice in a different accent, language, or dialect, any suitable alteration to the collaborator's vocals, or combination thereof.

Digital makeup may also include an image, audio, and/or video that is used to generate content without modification. For example, the digital makeup generator 320 may receive an image of a collaborator that the director intends to play a character, the digital makeup generator 320 may provide the image when prompting the content generation platform 150 to generate a cartoon character that looks like the collaborator in the image, and receive from the content generation platform 150 the cartoon version of the collaborator. Here, while there has been, in a sense, a modification from an image of a person to a cartoon version of that person, the appearance of the person is unmodified (e.g., no changes to a hair color, apparent age, body weight, etc.). Hence, the digital makeup generator 320 can generate content from a reference text, image, audio, and/or video without modification in addition or alternatively to generation with modification.

In addition to generating digital makeup, the digital makeup generator 320 may edit generated makeup based on user feedback. The digital makeup generator 320 may edit the makeup manually (i.e., in response to receiving user instructions to edit the makeup) or automatically. When automatically editing the makeup, the digital makeup generator 320 may determine a modification that the user is most likely to accept. For example, the digital makeup generator 320 may apply a machine-learned model to user inputs (e.g., feedback received from the user regarding their satisfaction with the digital makeup) or sensor data (e.g., video or images of the user's expression as the digital makeup is rendered over the video feed of their faces). The machine-learned model may be trained to classify, based on the inputs, a likelihood that the user would like to change the makeup and in response to the likelihood exceeding a threshold, the digital makeup generator 320 may generate a prompt for the content generation platform 150 requesting to modify the previously generated digital makeup. The generated prompt may include a parameter to change and a degree of change. For example, the digital makeup generator 320 may generate a prompt specifying that a digitally rendered mustache should change and that the degree of change should be to age the mustache by thirty years (e.g., the mustache's appearance becomes whiter).

The music and SFX generator 330 generates music and/or sound effects for a video, audiobook, podcast, song, or any suitable audio-based content. The music and SFX generator 330 receives a text-based, image-based, and/or audio-based input (e.g., from the director client device and/or the script generator 310) and generates a prompt for the content generation platform(s) 150. The music and SFX generator 330 can receive a text-based, image-based, and/or audio-based output from the content generation platform 150 (e.g., as generated by the generative AI video model 430 or a different generative AI model), where the output describes music or sound effects in the content (e.g., a text indicating that an explosion occurs during the middle of a character's dialogue). For example, the music and SFX generator 330 may receive at least a portion of an audiobook including character dialogue and/or description (i.e., text-based input) and an audio sample of the type of music genre the director wants to use for the portion of the audiobook (i.e., audio-based input), generate a prompt including the inputs for the content generation platform 150, and receive from the content generation platform 150 background music (e.g., an audio track or a text-based description songs recommended to the director based on the audiobook text and audio sample).

The music and SFX generator 330 may modify music and/or sound effects that a user provides or has previously used the collaborative content generation system 140 to generate. For example, a user may provide a prompt to modify the volume of an existing sound effect by starting with a lower volume and gradually getting louder. The music and SFX generator 330 may receive audio from a collaborator and determine that the collaborator has added sound effects to their audio (e.g., sound effects that were not originally in the script, but that the collaborator felt inspired to include as they read aloud lines from their dialogue). The music and SFX generator 330 may use a classifier model to detect the presence of sound effects as opposed to language. In response to determining that a collaborator's dialogue includes sound effects, the music and SFX generator 330 may generate a similar sounding sound effect and replace the collaborator's simulated sound effect with a more realistic sound effect. For example, the music and SFX generator 330 determines that a collaborator has said "pew pew," mimicking the sound of a laser gun being used and in response, the music and SFX generator 330 can request a sound of laser guns being fired from the content generation platform 400 and replace the collaborator's sound effect with the platform-generated sound effect.

The cinematography editor 340 edits the visual components of content using machine-learned model(s) of the content generation platform 150. The cinematography editor 340 may create or modify image frames of content or a storyboard on which the content is based. The cinematography editor 340 may digitally modify the lighting, focus, angle of a shot, color, any suitable cinematographic element of an image, or combination thereof. For example, the cinematography editor 340 may receive a video recording of a collaborator delivering a line of a script in a first angle, input the video recording to a generative AI video model along with a text-based description of the scene, and output a modified video recording depicting the original video recording in a second angle.

The cinematography editor 340 may generate prompts for display to the user to effectuate the director's instructions. The cinematography editor 340 may receive cinematography instructions (e.g., text-based) from the director client device 110 to capture a collaborator at a particular angle (e.g., "capture an over the shoulder shot of her" or "get a wide angle shot of the scene"). In response, the cinematography editor 340 may generate, for display at a collaborator client device, graphical indicator(s) of where the collaborator should position their head within a frame, where their gaze should be directed, any suitable visual instruction for positioning the collaborator, or a combination thereof. For example, the cinematography editor 340 may determine a circle in which the user should position their head (e.g., the pixel diameter of the circle on the client device display, the center pixel of the circle on the display, etc.) and cause the circle to be displayed as an overlay on the collaborator client device's front-facing camera feed. The cinematography editor 340 may then receive the video produced by the collaborator and provide the video to the director's client device for feedback of satisfaction. This feedback may be used to train a machine learning model trained to determine a likelihood that the particular director would like a particular type of camera shot and/or determine a likelihood that directors as a general group would like a particular type of camera shot. The cinematography editor 340 may apply the trained machine learning model for automatically recommending certain cinematographic modifications to directors.

The video compiler 350 arranges portions of content provided by the collaborators to produce the finalized content for transmission to a viewer client device. The video compiler 350 may interleave clips according to the order described in the script. In some embodiments, the CCG client at collaborator client devices may annotate each generated clip with an identifier of the portion of the script depicted in the generated clip. The video compiler 350 may interleave the generated clips based on those identifiers. The video compiler 350 may send requests to the cinematography editor 340 to create or edit video clips. For example, the video compiler 350 may request a transition scene from the cinematography editor 340.

The video compiler 350 may arrange portions of content from different users' generated content. For example, the video compiler 350 may receive a shared video from a first user and remix an initial video with characters from the shared video. The video compiler 350 may receive the shared video along with metadata related to the shared video's generation (e.g., the text and/or image based prompts used to generate the characters) and edit a prompt used by the collaborative content generation system 140 to generate characters of the initial video. The edited prompt may then be used to create the remixed video that incorporates or substitutes characters from the shared video. In another example, the video compiler 350 may remix music and/or sound effects from a shared video, incorporating audio from the shared video into another video or changing the style of existing audio based on the audio from the shared video. The video compiler 350 may edit a prompt used to generate the existing audio (e.g., editing the prompt to include a snippet of the audio from the shared video to instruct a model to output a similar sound).

The GUI generator 360 may generate and cause a GUI to be displayed at a client device. Examples of GUIs that the CCG system 140 can generate are shown in FIGS. 5A, 5B, 6A, and 6B. The GUIs can be generated for display at a CCG client application (e.g., the CCG client 210) on a client device (e.g., the client device 200). The GUI generator 360 may enable a user to edit the content displayed at a GUI. For example, the GUI generator 360 may cause for display on a GUI lines of dialogue and enable a user to edit the lines in response to receiving a user selection of a line. In another example of editing the generated content, the GUI generator 360 may cause storyboard images generated based on a user's prompt for a short video to be displayed at a GUI, receive a user's selection of one of the storyboard images, display at least a portion of the user's prompt that contributed to the generation of the selected storyboard image, and prompt the user if they want to change the displayed portion to re-generate the storyboard image.

The storage 370 may store similar or all of the same data stored by the database 160. In some embodiments, only one of the storage 370 or the database 160 exists.

Figure 4:
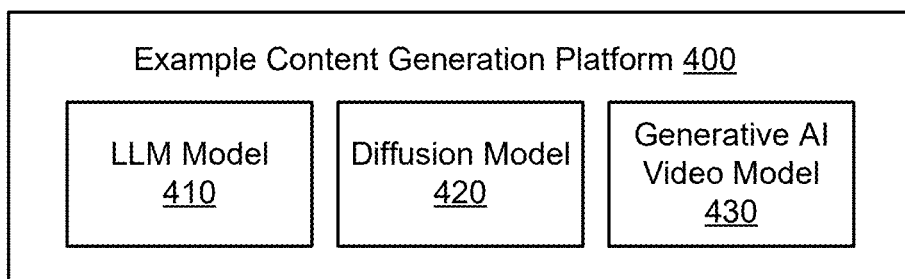
FIG. 4 is a block diagram of an example content generation platform, in accordance with one embodiment.

FIG. 4 is a block diagram of an example content generation platform 400, in accordance with one embodiment. The content generation platform 400 may be the content generation platform(s) 150. The content generation platform 400 includes an LLM model 410, a diffusion model 420, and a generative AI video model 430. In some embodiments, the content generation platform 400 includes more, less, or different components than those shown in FIG. 4. For example, the client device 200 may not include the generative AI video model 430 and may include a machine learning model configured to classify the likelihood that a collaborator has performed their portion of the script according to the director's instructions. In another example, the content generation platform 400 includes additional a generative voice model and a music and sound effect model, where the generative voice model may be used to create characters' voices and the music and sound effect model may be used to create or select music and sound effects (e.g., based on a text input describing a scene).

The LLM model 410 may receive from the script generator 310 a prompt requesting a script generated based on a structure parameter and descriptive parameter inputs. The LLM model 410 may receive from the director client device 110 a prompt requesting instructions to direct a collaborator based on a text input describing the desired performance. The LLM model 410 may receive from the script generator 310 a prompt requesting instructions to cause the director to provide more specific descriptive parameters for a generated script (e.g., to prompt the director to specify the ending of a movie they want to produce). The LLM model 410 may receive from the script generator 310 a follow-up prompt requesting that a script previously generated by the LLM model 410 be edited (e.g., modify the script to be shorter, funnier, scarier, etc.). The LLM model 410 may generate or edit scripts, generate or edit instructions to users of the collaborative content generation system 140 (e.g., a director, a collaborator, etc.), generate or edit descriptions of characters or any suitable aspect of a story, or any suitable generation or modification of text-based content related to content generation.

The diffusion model 420 receives inputs from the script generator 310, which may include a prompt for generating digital makeup. This prompt is based on a script and may include image-based inputs, such as a reference image like da Vinci's Mona Lisa, which a director may wish to use as a basis for a character's appearance. The diffusion model 420 is configured to process these inputs to generate one or more images of digital makeup that correspond to the provided input parameters. In some embodiments, the diffusion model 420 adjusts the generated digital makeup to align with the thematic and stylistic elements specified in the script. Such alignment may involve modifying facial features, accessories, and other visual aspects depicted in the digital makeup to ensure a cohesive appearance when applied to a character in a scene. Additionally, the diffusion model 420 is capable of storing these generated images for further refinement or direct application in visual content, further streamlining the content creation process by utilizing generated visuals that meet the director's artistic requirements or preferences.

The generative AI video model 430 may receive from the video compiler 350 a prompt including an image or video of digital makeup generated by the digital makeup generator 320 and content produced by a collaborator (e.g., an audio and/or video recording of the script). The generative AI video model 430 may output a video of the collaborator having the digital makeup overlaid over them. For example, the digital makeup is an image of glasses and the generative AI video model 430 outputs a video of the collaborator having the glasses overlaid on their face, where different angles of the glasses are generated for viewing based on the angle of the collaborator towards the camera. The generative AI video model 430 may output audio of a character or narrator in a script based on a prompt received from the collaborative content generation system 140. For example, the collaborative content generation system 140 may provide the generative AI video model 430 a prompt describing a desired narrator for a story: "The narrator is the grandpa of the main character in the story. The grandpa is from England and speaks slowly and softly." The generative AI video model 430 may output audio of the narrator reading lines from a script (e.g., a script generated by the LLM model 410). The generative AI video model 430 may receive from the cinematography editor 340 a prompt including images of a desired transition scene. The generative AI video model 430 may output a video of the desired transition scene having characteristics similar to the inputted images.

The content generation platform 400 may enable the creation of storyboards, which serve as preliminary visual representations within the collaborative interleaved content series (CICS). In this context, a storyboard acts as a strategic planning tool that outlines a sequence of scenes and events, facilitating the visualization and organization of narrative elements prior to final production. The outline may include visual representations, dialogue, ambiance indicators, tone indicators, etc. In some examples, users may provide input that the content generation platform 400 utilizes to generate the storyboard, presenting a structured framework that captures, e.g., story dynamics and scene transitions.

A storyboard may be utilized to incorporate context that seamlessly interconnects the various segments of collaborative content. As an example, this context may include the continuity and progression of characters as they transition between different scenes, as well as the timing of different characters entering and exiting different scenes. By maintaining this level of contextual awareness, the collaborative content generation system 140 enables visual and thematic consistency across all user contributions when interleaving content. This consistency is important to uphold as it enables a cohesive narrative experience, preserving the integrity and flow of the final content by aligning the collaborative inputs with the intended storyline.

In some embodiments, the content generation platform 400 may incorporate various models to facilitate the conversion and generation of content across multiple mediums. This may encompass translator models which convert input from one medium into another that can be interpreted by existing models. For instance, the content generation platform 400 may deploy a machine learning model that processes audio from a soundtrack selected by a director, transforming it into a text-based format. This text-based output may then serve as input for the LLM model, which could generate a script reflective of the audio's attributes, such as a high tempo indicating an energetic scene. Additionally, the platform may include a Visual Language Model (VLM) capable of analyzing visual input and producing descriptive text that can be utilized in further computational processes. Still other models are also possible withing the example content generation platform.

The content generation platform 400 can produce multimedia content, including videos, scripts, storyboards, and digital augmentations like audio and visual makeup, at various levels of fidelity. Different levels of fidelity refer to the degree of detail and quality presented in the generated content. At lower fidelity, content may include simplified visuals or audio, with basic outlines or rough drafts, allowing for rapid production. This low-fidelity content serves as a preliminary stage where directors and collaborators can efficiently make adjustments and explore different creative directions without significant processing time or resource consumption. Higher fidelity content, on the other hand, delivers more detailed and polished outputs, such as high-resolution video or sophisticated audio, requiring more time and computational resources to generate. By leveraging the flexibility of producing content at these varying fidelities, users can streamline the creative process, enabling iterative enhancements and refinements that ultimately contribute to a more cohesive and high-quality final product once the full fidelity rendering is engaged.

As an example, a creator may organize multiple pieces of content by employing a storyboard along with its detailed outline. By using the storyboard format, any edits to the narrative flow, such as adjusting ambient elements of a scene, can be executed without the necessity for full rendering of the scene, thus improving resource usage. The storyboard serves as the preliminary structure, where adjustments can be made not just in the sequence of events but also in the thematic and tonal elements without incurring large computational costs. This allows the director to iteratively refine the content efficiently. Once the storyboard is deemed complete, the director may then initiate a comprehensive rendering and interleaving process, allowing the final production to be generated with all elements cohesively integrated.

Example Processes for Generating Collaborative Content

FIGS. 5A and 5B illustrate an example process and user interfaces for generating a script based on user-provided parameters, in accordance with one embodiment. A director may use a CCG client application on the director client device 110 to generate a script. The CCG client application may have a GUI having views 500a and 500b for generating a script.

FIG. 5A depicts the view 500a of the GUI, where the view 500 includes an input window in which the director may provide a desired structure parameter. The director's selected structure parameter is provided from the director client device 110 to the CCG system 140. For example, the director may select from the story type options of "action," "comedy," "fantasy," "romance," "sci-fi," "horror," "musical," and "other." As depicted in FIG. 5A, the director has selected the option 510 of "horror." The CCG system 140 may accept one or more structure parameters as input (i.e., to reflect stories having multiple genres). Each option may correspond to one or more structure parameters. For example, the option of "musical" may include additional dramas such as comedy and action, which the director may also manually select on the GUI or for which the CCG system 140 may prompt the director.

In response to selecting "other," the CCG system 140 may generate an input window where the director may type in a different structure parameter or what they believe to be a structure parameter. For example, the director may type in "Korean drama," which does not necessarily indicate an exact genre of script the director wishes to generate. In response, the CCG system 140 may use a machine learning model (e.g., an LLM of the content generation platform 150) to determine one or more structure parameters that characterize Korean dramas and generate a prompt for display at the client device 110 that instructs the director to specify a structure parameter (e.g., "Would you like to tell a historical drama set in the Joseon period? A fantasy romance involving Korean folklore such as goblins?"). The CCG system 140 may repeat the prompting process with the director until the director has specified a desired structure parameter.

FIG. 5B depicts the view 500b of the GUI for generating a script using the CCG system 140. The view 500b includes a text input box 520 for the director to provide descriptive parameters in natural language. The script generator 310 may receive the sentence "Three friends go exploring at night, and something goes wrong" from the director client device 110 and determine descriptive parameters such as "three friends," "exploring," "night," "something goes wrong." The script generator 310 may prompt the director to provide more information about the determined parameters, where the additional information may produce additional descriptive parameters for refining the script generated by the content generation platform 150. For example, the script generator 310 may determine to prompt the user to elaborate further on the descriptive parameter "something goes wrong" by generating the dialogue "Does somebody get hurt? Is there a supernatural being?" and presenting the prompt at the director client device 110. The script generator 310 may use the content generation platform 150 to generate the dialogue by prompting an LLM of the content generation platform 150 with a request to coax additional information from the director related to the description "something goes wrong."

FIGS. 6A and 6B illustrate an example process and user interfaces for generating a video clip of content based on a generated script, in accordance with one embodiment. A collaborator may use a CCG client application on the collaborator client device 120 to perform a portion of a script. The CCG client application may have a GUI having views 600a and 600b for reading and performing a portion of a script. The views 600a and 600b may be a part of the same GUI providing the views 500a and 500b of FIGS. 5A and 5B.

FIG. 6A depicts the view 600a of the GUI on the collaborator client device 120. The view 600a of the GUI shows a script of a horror story entitled "Whispers from the Basement" generated by director having the user handle "ChristopherC" four minutes from the time at which the collaborator is currently viewing the GUI. The GUI includes a chat button which can be selected by the collaborator to cause the CCG system 140 to enable the collaborator to communicate (e.g., send a text message) to the director. The GUI includes a favorite button which can be selected by the collaborator to cause the CCG system 140 to add the director to the collaborator's contact list (e.g., a list of favorite directors) and/or cause the CCG system 140 to add the script to the collaborator's script list (e.g., a list of favorite scripts).

The view 600a of the GUI includes a display of the script generated by the CCG system 140. The script opens with a cinematographic cue that the movie fades into an external view of an abandoned house followed by line delivery from two characters, Jake and Emily. Each of the transition scenes (i.e., the scenes without dialogue) and dialogue scenes of the script are displayed alongside a recording button. For example, the dialogue scene 610 with the lines "You guys sure about this? I heard this place is haunted." has a recording button 620 displayed next to it. If a collaborator selects the recording button 620, the CCG client application may cause the view 600b of the GUI to be displayed. In some embodiments, a collaborator may select lines in a dialogue scene and the CCG system 140 may enable the collaborator to edit the lines, save edits, and notify other users (e.g., the director) of the edits.

In some embodiments, the view 600a may display a storyboard view of the script. For example, next to each line of dialogue (e.g., located next to the recording buttons), the CCG system 140 may display a storyboard image generated by the content generation platform 400. The CCG system 140 may display content in a storyboard view, which deem-phasizes the lines of dialogue and instead, emphasizes the images of a storyboard. For example, the lines of dialogue may be truncated or minimized (e.g., expandable when a user clicks on a line) while storyboard images occupy a greater portion of the GUI than the dialogue lines.

FIG. 6B depicts the view 600b of the GUI, where the view 600b includes a camera window 630 showing a real-time camera feed of the collaborator (e.g., a front facing camera feed) having digital makeup 640 (i.e., a digital pair of glasses) applied to the video of their face as they are reading their line. The video feed is captured by a camera 650 of the collaborator client device 120 and the collaborator's vocals 660 is captured by the microphone 670 of the collaborator client device 120.

In this embodiment, the digital makeup 640 is applied in real-time as the collaborator is recording their line. In alternative embodiments, the digital makeup may be applied to pre-recorded video of the collaborator delivering their line. For example, the CCG system 140 may receive the pre-recorded video from the collaborator client device 120 and apply the digital makeup using the digital makeup generator. In another example, the CCG system 140 may apply digital makeup to the collaborators' pre-recorded videos after the director has selected which videos to include in the finalized CICS and the order in which the selected videos may appear. The method of applying digital makeup to pre-recorded videos may preserve processing and power resources at the collaborator client device 120, which may be particularly useful if the collaborator client device 120 is a wireless device with limited battery power. However, processing the digital makeup in real-time at the collaborator client device 120 enables the collaborator to view their digital makeup as they are delivering the line. This enhances the content production process, as the collaborator may be inspired to deliver their lines with more passion as they are seeing themselves transformed into the character or because the collaborator can provide feedback of the makeup earlier than they could if the pre-recorded video had been sent to the CCG system 140 for post-processing.

Figure 7:
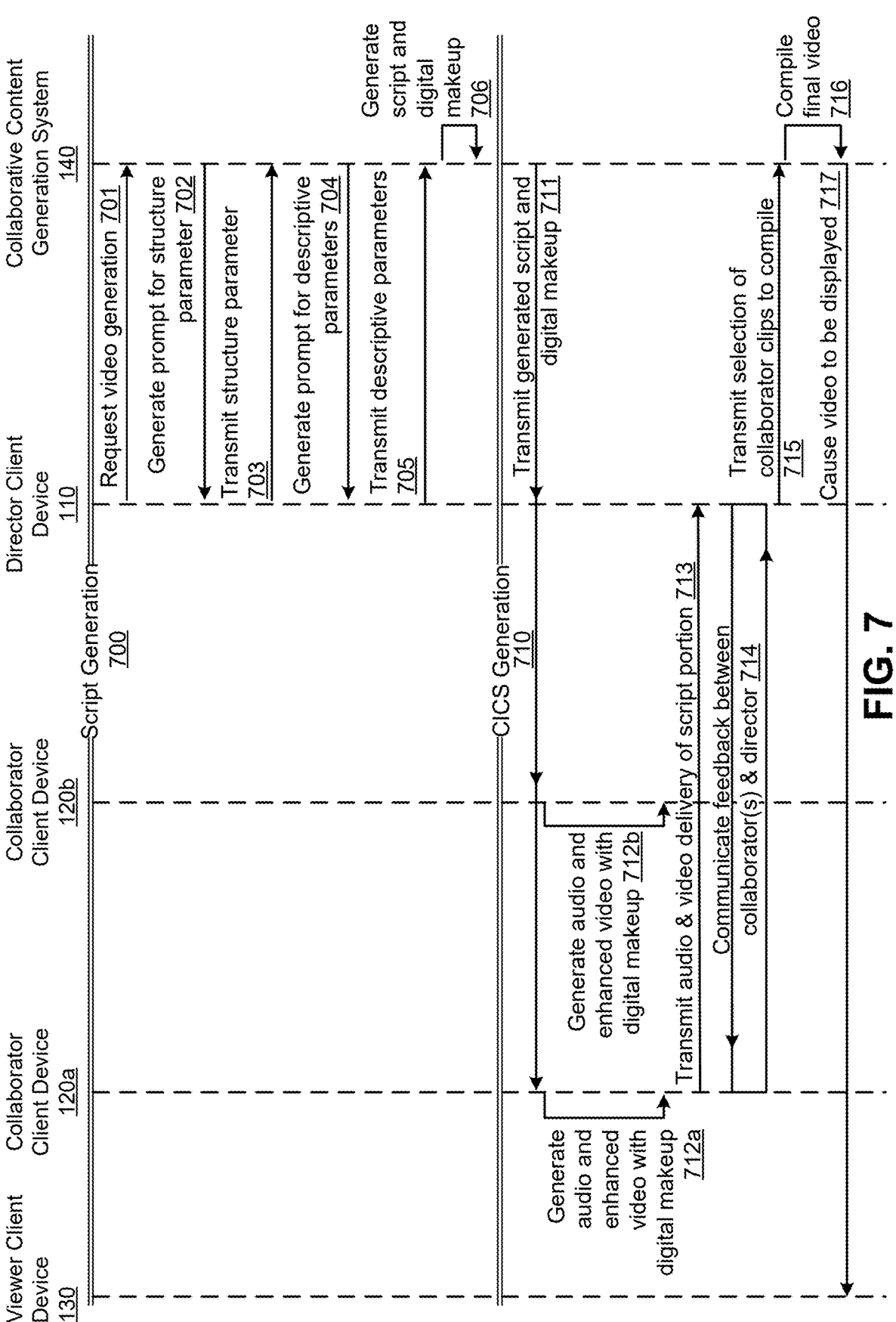
FIG. 7 is a timing diagram of script and collaborative interleaved content series (CICS) generation using the collaborative content generation system, in accordance with one embodiment.

FIG. 7 is a timing diagram of script and CICS generation using the collaborative content generation system, in accordance with one embodiment. The timing diagram captures two phases of the collaborative content generation enabled by the CCG system 140: the script generation 700 and the CICS generation 710 phases. The script generation 700 involves the director client device 110 and the CCG system 140. The CICS generation 710 involves the director client device, 110, the collaborator client devices 120a and 120b, the CCG system 140, and finally, the viewer client device 130 for content consumption. In addition to the order depicted in FIG. 7, some operations in the timing diagram of FIG. 7 may be performed in alternative orders or in parallel. Although FIG. 7 depicts an embodiment where video is generated, the CCG system 140 may generate alternative forms of content (e.g., an audiobook).

The script generation 700 begins with the director client device 110 requesting 701 a video be generated using the CCG system 140. The CCG system 140 generates 702 a prompt for a structure parameter (e.g., the GUI of FIG. 5A). The director client device 110 transmits 703 a structure parameter selected by the director. The CCG system 140 generates 704 a prompt for descriptive parameters (e.g., the GUI of FIG. 5B). The director client device 110 transmits 705 descriptive parameters. The CCG system 140 generates 706 a script and digital makeup. In particular, the CCG system 140 may generate the script and corresponding characters (e.g., textual descriptions of the characters in the script) using an LLM of the content generation platform 150. In turn, the CCG system 140 may use the generated characters to render digital makeup using a diffusion model of the content generation platform 150 (e.g., a text-based description of the character to an image of the character and their digital makeup). The generation 706 is further described in FIGS. 8A and 8B.

Additionally, the director client device 110 may receive a director's assignment of collaborators to lines (or vice versa), the CCG system 140 may automatically assign lines to collaborators (e.g., using a casting model described with respect to FIG. 3), or a combination thereof. The assignment is not depicted in FIG. 7 but may be performed either by the director or by the CCG system 140. Regardless, the CCG system 140 records the assignment of collaborators to lines and may provide a visual indicator of the assignment to the respective collaborator (e.g., the dashed box in FIG. 6A over particular lines may be visible to the collaborator as a cue that those lines were assigned to him).

Following the script generation 700, the CICS generation 710 commences. Although the CICS generation 710 is depicted as proceeding with the script generated during the script generation 700, the CCG system 140 may perform the CICS generation 710 using a script that has not been generated by the CCG system 140. The CCG system 140 transmits 711 the generated script and digital makeup to the one or more of the director client device 110, the collabo-rator client device 120a, and the collaborator client device 120b. Although not depicted, after receiving the script and digital makeup, one or more of the director client device 110, the collaborator client device 120a, and the collaborator client device 120b may provide feedback to the CCG system 140 and/or request modifications to the script and/or the digital makeup. The CCG system 140 leverages the content generation platform 150 to fulfill requests to modify the script and/or the digital makeup.

The collaborator client devices 120a and 120b generate 712a and 712b audio and enhanced video with digital makeup of the script portions assigned to the respective collaborators. That is, sensors of the collaborator client devices 120a and 120b (e.g., microphones and cameras) capture audio and video of the collaborators performing their assigned lines. The collaborator client devices 120a and 120b apply digital makeup to the captured audio and/or video using the digital makeup generated 706 by the CCG system 140. The collaborator client devices 120a and 120b transmit 713 their audio and video delivery of the script portions to the director client device 110. The director and collaborator client devices may communicate 714 feedback regarding the performed portions of script and re-record according to the communicated feedback. The CCG client may include a messaging function which facilitates this communication.

The director client device 110 may select which record-ings of the script readings to select for the finalized CICS and transmit 715 the selection of the collaborator clips for the CCG system 140 to compile. The CCG system 140 compiles 716 the final CICS. The video compiler 350 may compile the collaborator clips in a sequence corresponding to the script's order. The video compiler 350 may also generate transition scenes for compilation with the collaborator clips and/or edit the collaborator clips using the cinematography editor 340. The CCG system 140 causes 717 the CICS to be displayed at a viewer client device 130.

Figure 8A:
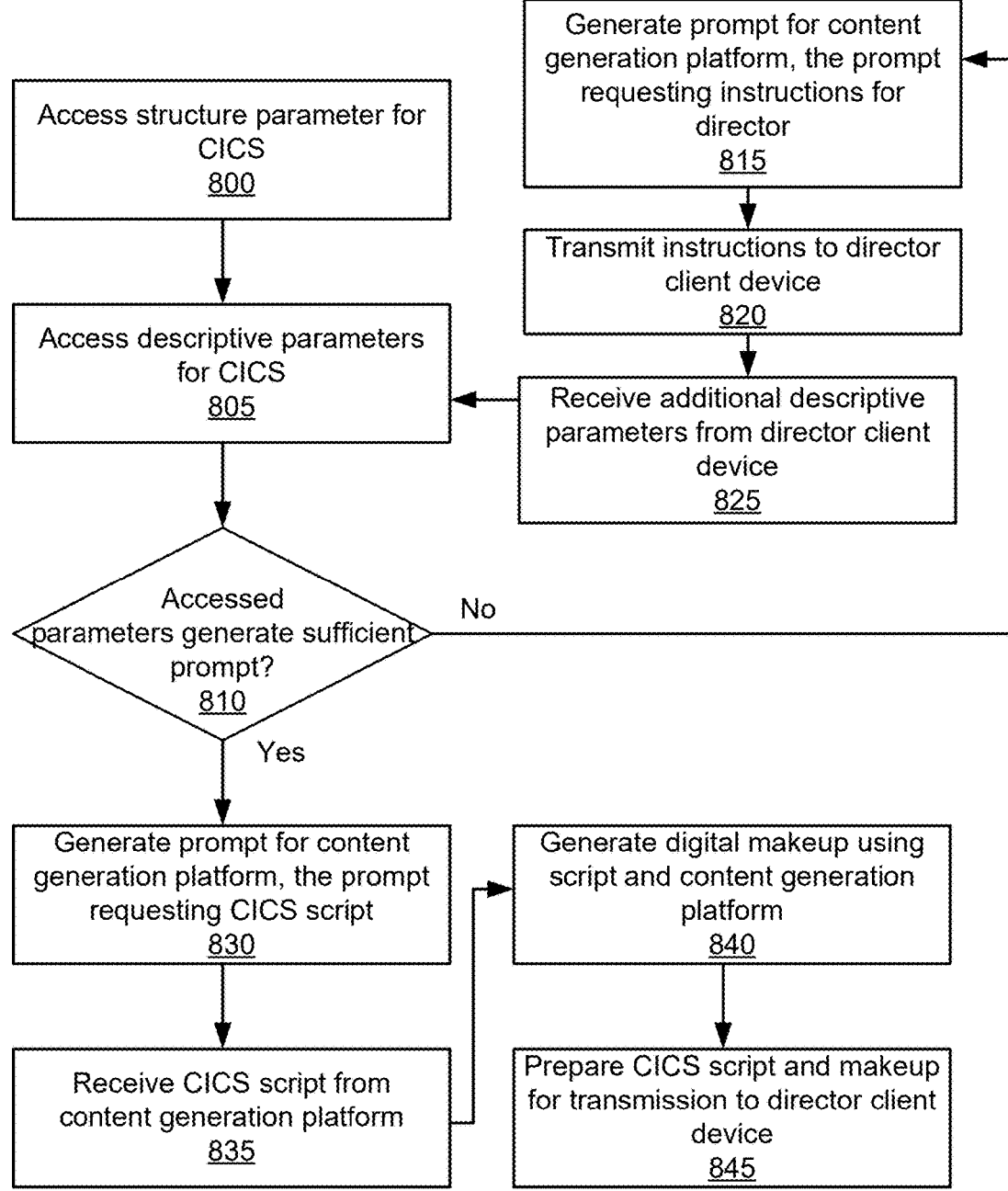
FIG. 8A is a flowchart of an example process for generating a script, in accordance with one embodiment.

FIG. 8A is a flowchart of an example process for generating a script, in accordance with one embodiment. The process may be performed by the CCG system 140. The CCG system 140 may perform operations of the process in parallel or in different orders, or may perform different, additional, or fewer steps. Additionally, each of these steps may be performed automatically by the CCG system 140 without human intervention.

The CCG system 140 accesses 800 at least one structure parameter for the CICS. For example, the CCG system 140 accesses 800 the structure parameter of "horror" selected by the director and received from the director client device.

The CCG system 140 accesses 805 descriptive parameters for the CICS. Following the earlier example, the CCG system 140 accesses 805 descriptive parameters from the natural language input "Three friends go exploring at night, and something goes wrong" received from the director client device. The CCG system 140 may apply one or more models (e.g., a natural language processing model and a machine learning model) to identify and prioritize likely descriptive parameters (e.g., "three friends," "exploring," "at night," and "something goes wrong.").

The CCG system 140 determines 810 whether the accessed parameters are sufficient for generating a prompt to request a script from the content generation platform 150. Following the earlier example, the CCG system 140 determines 810 whether the structure parameter of "horror" along with descriptive parameters "three friends," "exploring," "at night," and "something goes wrong" are sufficient to generate a script. The CCG system 140 may apply a machine-learned model trained on previously generated scripts and corresponding parameters used to generate those scripts (e.g., descriptive and/or structural parameters). The trained model may be trained using datasets that a human has determined as a sufficient script (e.g., the story generated by the LLM has a satisfactory plot and ending given the parameters provided by the director). The trained model may classify the parameters as sufficient or insufficient.

If the parameters are insufficient, the CCG system 140 generates 815 a prompt for the content generation platform, where the prompt requests instructions for the director to specify additional descriptive parameters. Following the previous example, the CCG system 140 may generate a prompt for an LLM of the content generation platform 150 requesting instructions to send to the director. For example, the CCG system 140 may generate 815 a prompt using a descriptive parameter and sample descriptive parameters related to the director-selected structure parameter. The content generation platform 150 may output instructions for the director such as "You want something to go wrong. Will something happen to the friends one by one?" based on the pattern in horror films of individual characters experiencing an unfortunate demise one by one.

The CCG system 140 transmits 820 instructions to the director client device.

The CCG system 140 receives 825 additional descriptive parameters from the director client device. The CCG system 140 returns to determine 810 whether the additional accessed parameters in combination with the previously provided parameters are sufficient for generation a prompt for a script.

If the parameters are sufficient, the CCG system 140 generates 830 a prompt for the content generation platform, where the prompt requests the CICS script. Following the previous example, the CCG system 140 generates 830 a prompt "Write a horror movie script with three friends who go exploring at night and something goes wrong for each of the friends." The CCG system 140 provides the generated prompt for input to the content generation platform 150 (e.g., an LLM).

The CCG system 140 receives 835 a CICS script from the content generation platform. The CICS script may include characters' descriptions and dialogue. Following the previous example, the CICS script may include the description of the three friends and their dialogue (e.g., as shown in FIG. 6A).

The CCG system 140 generates 840 digital makeup using the script and the content generation platform. Following the previous example, the CCG system 140 generates 840 glasses that are broken and taped up at the bridge (i.e., the stereotypical nerdy glasses) for a character in the horror script who is afraid of the adventure that his friends are going on. An example of this digital makeup is shown in FIG. 6B.

The CCG system 140 prepares 845 the CICS script and the makeup for transmission to director client device. Following the previous example, the CCG system 140 may generate a casting recommendation in preparation 845 for transmitting the CICS script and makeup to the director client device. Additionally, or alternatively, the CCG system 140 may add visual indicators to different copies of the script highlighting the lines of each collaborator (e.g., a copy of the script for a first collaborator has all of the first collaborator's lines highlighted).

Figure 8B:
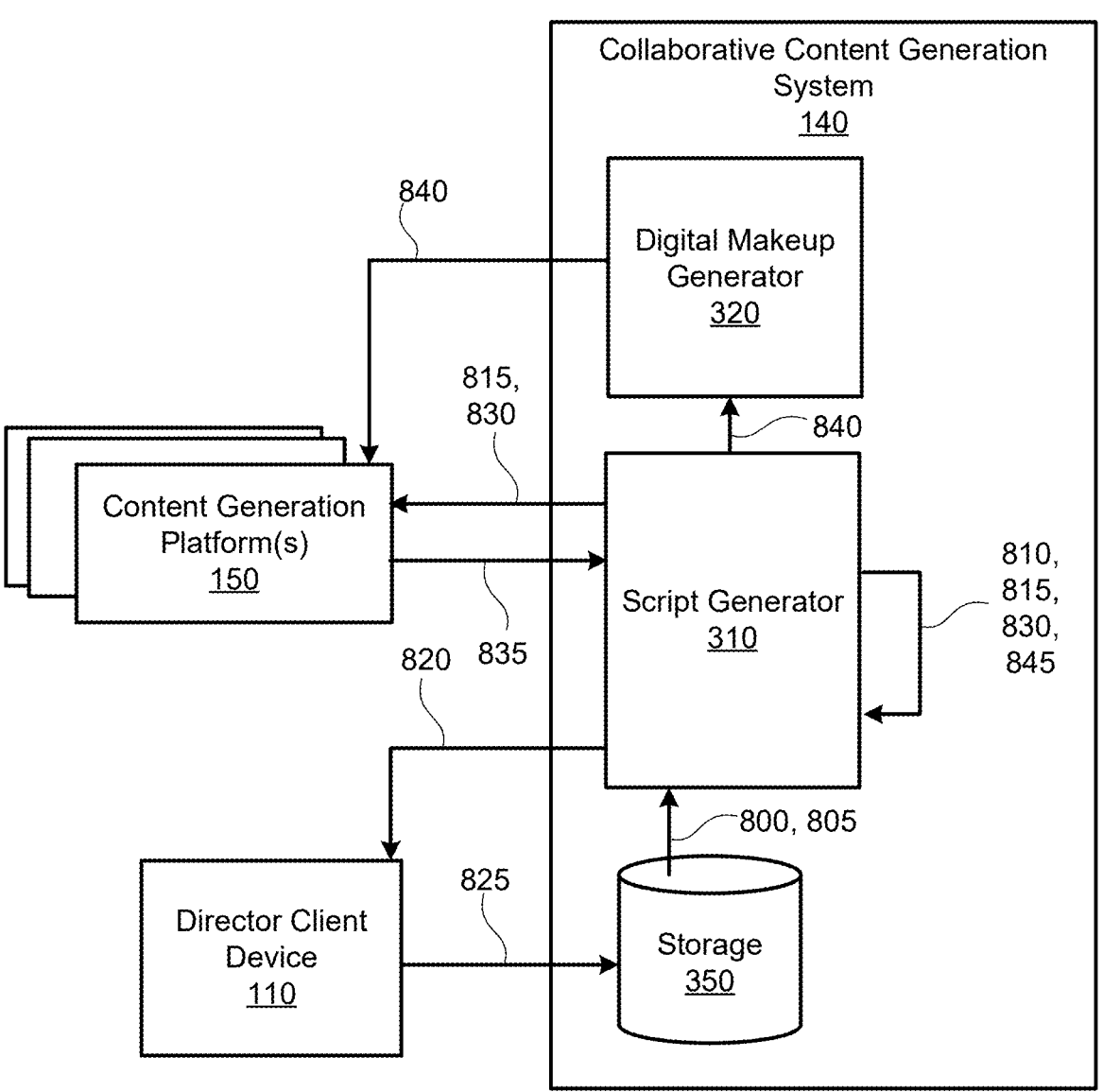
FIG. 8B is a block diagram illustrating the interactions between components of the collaborative content generation system to perform the process of FIG. 8A, in accordance with one embodiment.

FIG. 8B is a block diagram illustrating the interactions between components of the collaborative content generation system to perform the process of FIG. 8A, in accordance with one embodiment. The script generator 310 accesses 800 and 805 the structure parameter and descriptive parameters from the storage 370, which received the parameters from the director client device 110. The script generator 310 determines 810 whether the accessed parameters are sufficient for generating a prompt for the content generation platform 150 to create a script. The script generator 310 generates a prompt for the content generation platform and transmits 820 instructions to the director client device. The storage 370 receives 825 additional description parameters from the director client device 110. If the script generator 310 determines 810 that the accessed parameters are sufficient, the script generator 310 generates 830 a prompt for the content generation platform, where the prompt requests a CICS script. The script generator 310 receives 835 a CICS script from the content generation platform 150. The digital makeup generator 320 generates 840 digital makeup based on the script and the content generation platform. The script generator 310 prepares 845 the CICS script and makeup for transmission to the director client device 110.

Figure 9A:
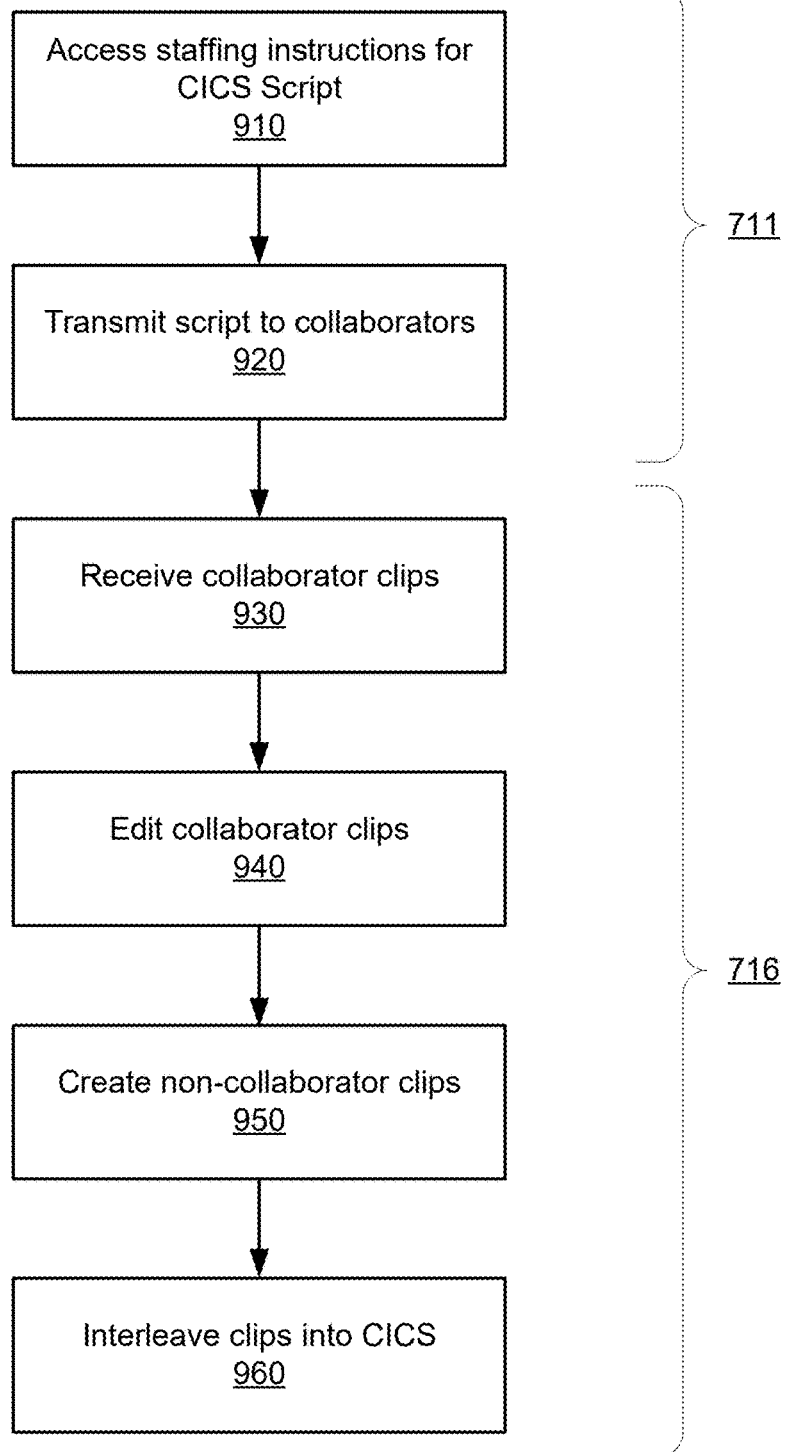
FIG. 9A is a flowchart of an example process for generating collaborative content based on a script, in accordance with one embodiment.

FIG. 9A is a flowchart of an example process for generating collaborative content based on a script, in accordance with one embodiment. The process is composed of operations within the broader operations 711 and 716 of FIG. 7. Although the process refers to a script generated by the CCG system 140, the process may also be performed with a script not generated by the CCG system 140 (e.g., a script of a movie from another decade). The process may be performed by the CCG system 140. The CCG system 140 may perform operations of the process in parallel or in different orders, or may perform different, additional, or fewer steps. Additionally, each of these steps may be performed automatically by the CCG system 140 without human intervention.

The CCG system 140 accesses 910 staffing instructions for a CICS script. The CCG system 140 may assign portions of the CICS script to different collaborators based on a manual assignment received from the director client device. The instructions for manual assignment may be accessible from the storage 370. Alternatively, or additionally, the CCG system 140 may automatically determine staffing instructions using a machine-learned model.

The CCG system 140 transmits 920 the script to collaborators. For example, the CCG system 140 may use the network 170 to transmit the script to the collaborator client device(s) 120.

The CCG system 140 receives 930 collaborator clips, which include the collaborators' performance and recording of their respective portions of the script. For example, a collaborator may record a video of themselves reading lines from a script using a collaborator client device 120 and send the recording to the collaborative content generation system 140 via the network 170.

The CCG system 140 edits 940 collaborator clips. The CCG system 140 may apply one or more of the received 930 collaborator clips to a diffusion model or to a generative AI video model that is trained to produce variations of the clips. Examples of variations include a collaborator delivering the same dialogue in a different angle, changing the background of the collaborator, changing the digital makeup, any other suitable change to the video to convey the same script in a different way, or a combination thereof.

The CCG system 140 creates 950 non-collaborator clips. Non-collaborator clips are video clips in which the collaborators are not delivering dialogue (e.g., scenes transitioning between environments where the characters are not talking). The CCG system 140 may prompt the director client device and/or the collaborator client device(s) for images of the environment shown in scenes transitioning between dialogue frames. The CCG system 140 may apply the script, the received images, and/or the received 930 collaborator clips to the content generation platform 150 to create 950 transition scene video(s).

The CCG system 140 interleaves 960 the clips into the CICS. The CCG system 140 may interleave 960 the collaborator and non-collaborator clips in an order specified by the CICS script.

Figure 9B:
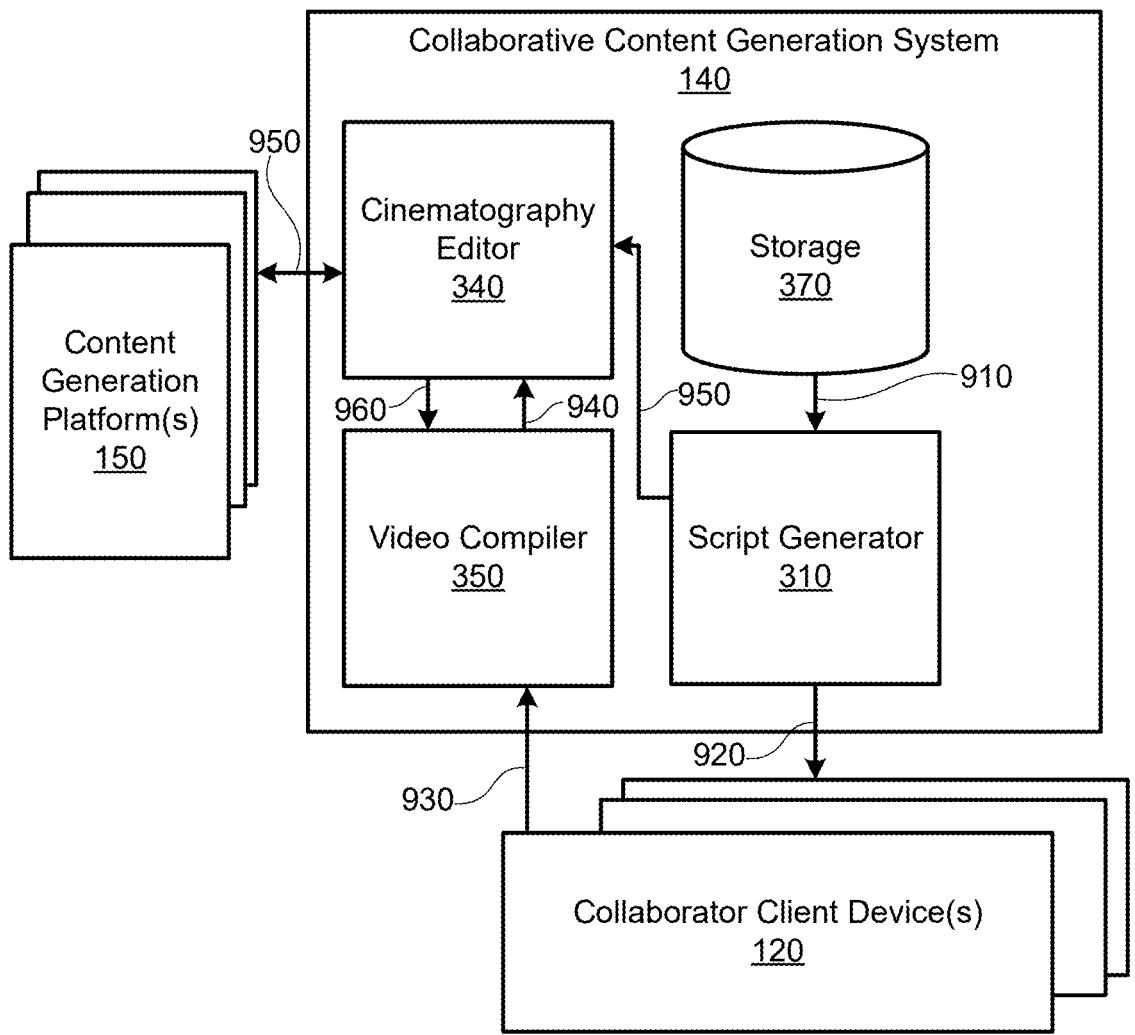
FIG. 9B is a block diagram illustrating the interactions between components of the collaborative content generation system to perform the process of FIG. 9A, in accordance with one embodiment.

FIG. 9B is a block diagram illustrating the interactions between components of the collaborative content generation system to perform the process of FIG. 9A, in accordance with one embodiment. The script generator 310 accesses 910 staffing instructions for the CICS script from the storage 370. The script generator 320 transmits 920 the script to collaborator client device(s) 120. The video compiler 350 receives 930 the collaborator clips. The cinematography editor edits 940 the received collaborator clips and creates 950 non-collaborator clips using the content generation platform(s) 150. The video compiler 350 receives edited and created clips from the cinematography editor 340 and interleaves 960 the clips into the finalized CICS.

Figure 10:
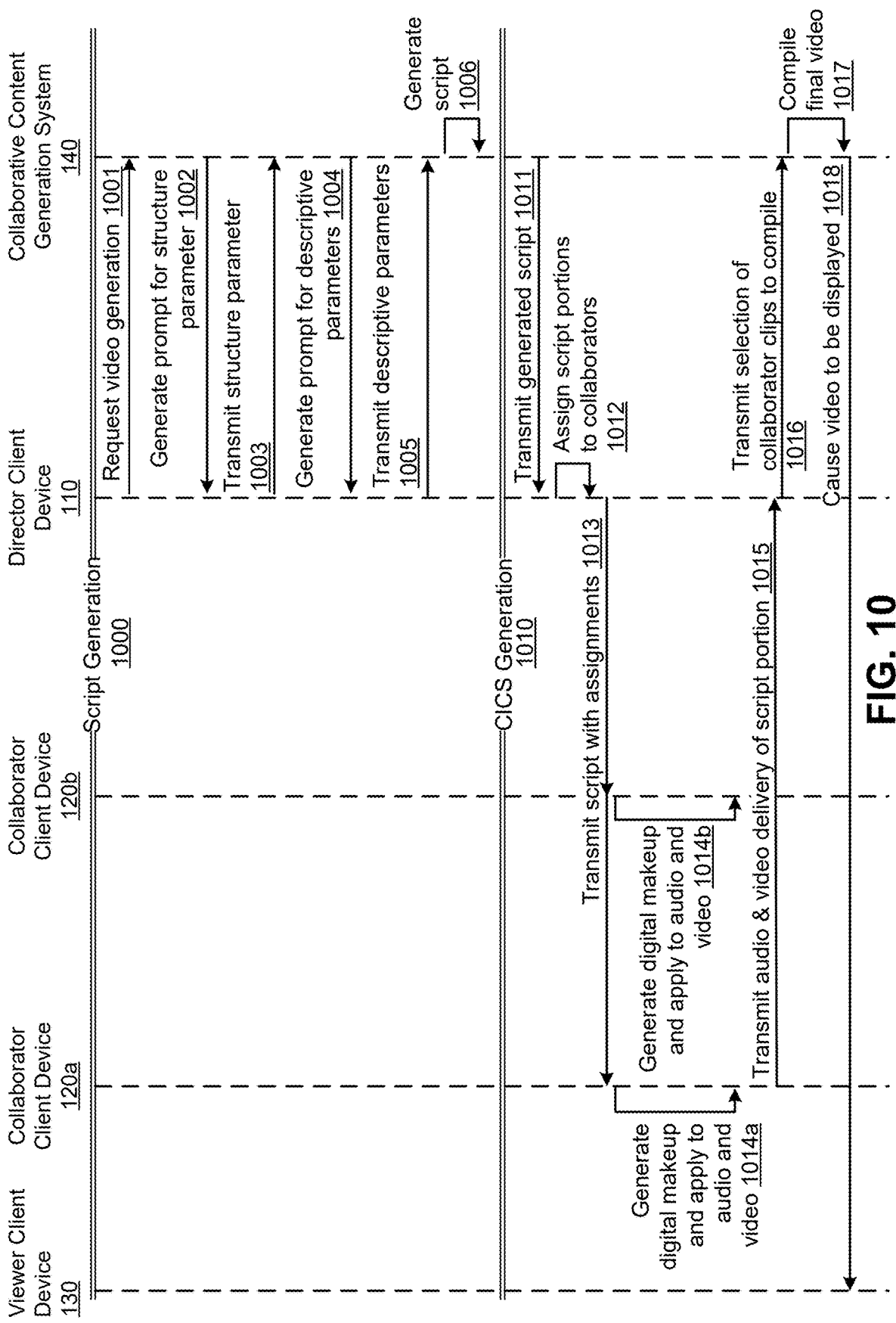
FIG. 10 is a timing diagram of script and CICS generation with digital makeup generated at client devices, in accordance with one embodiment

FIG. 10 is a timing diagram of script and CICS generation with digital makeup generated at client devices, in accordance with one embodiment. The timing diagram captures two phases of the collaborative content generation enabled by the CCG system 140: the script generation 1000 and the CICS generation 1010 phases. The script generation 1000 is similar to the script generation 700 of FIG. 7. The primary difference in this embodiment as compared to the embodiment in FIG. 7 is that the collaborative content generation system 140 does not generate the digital makeup along with the script at generation 1006. Although FIG. 10 depicts an embodiment where video is generated, the CCG system 140 may generate alternative forms of content (e.g., an audiobook). In addition to the order depicted in FIG. 10, some operations in the timing diagram of FIG. 10 may be performed in alternative orders or in parallel.

The script generation 1000 involves the director client device 110 and the CCG system 140. The CICS generation 1010 involves the director client device, 110, the collaborator client devices 120a and 120b, the CCG system 140, and finally, the viewer client device 130 for content consumption. The script generation 1000 begins with the director client device 110 requesting 1001 a video be generated using the CCG system 140. The CCG system 140 generates 1002 a prompt for a structure parameter (e.g., the GUI of FIG. 5A). The director client device 110 transmits 1003 a structure parameter selected by the director. The CCG system 140 generates 1004 a prompt for descriptive parameters (e.g., the GUI of FIG. 5B). The director client device 110 transmits 1005 descriptive parameters. The CCG system 140 generates 1006 a script. In particular, the CCG system 140 may generate the script and corresponding characters (e.g., textual descriptions of the characters in the script) using an LLM of the content generation platform 150.

Following the script generation 1000, the CICS generation 1010 commences. Although the CICS generation 1010 is depicted as proceeding with the script generated during the script generation 1000, the CCG system 140 may perform the CICS generation 1010 using a script that has not been generated by the CCG system 140. The CCG system 140 transmits 1011 the generated script to the one or more of the director client device 110, the collaborator client device 120a, and the collaborator client device 120b. Although not depicted, after receiving the script and digital makeup, one or more of the director client device 110, the collaborator client device 120a, and the collaborator client device 120b may provide feedback to the CCG system 140 and/or request modifications to the script. The CCG system 140 can leverage the content generation platform 150 to fulfill requests to modify the script and/or the digital makeup.

The director client device 110 assigns 1012 lines of the script to collaborators (or vice versa). receives a director's assignment of collaborators to lines (or vice versa). The CCG client on the director client device 110 may receive a director's assignment (i.e., manual user input) or automatically determine a recommendation of assignments for confirmation by the director. The CCG system 140 records the assignment of collaborators to lines and may provide a visual indicator of the assignment to the respective collaborator. The director client device 110 then transmits 1013 the script with the assignments to the collaborator client devices 120a and 120b.

The collaborator client devices 120a and 120b may use the characters generated in the script to generate 1014a and 1014b digital makeup using a diffusion model of the content generation platform 150 (e.g., a text-based description of the character to an image of the character and their digital makeup). For example, to generate 1014a the digital makeup, the CCG client at the collaborator client device 120a may generate a prompt using the text description of a character in the received script and transmit the prompt to the content generation platform(s) 150 to request digital makeup for the character.

The collaborator client devices 120a and 120b additionally apply 1014a and 1014b the generated digital makeup to the audio and video to generate recordings that are enhanced by digital makeup. That is, sensors of the collaborator client devices 120a and 120b (e.g., microphones and cameras) capture audio and video of the collaborators performing their assigned lines. The collaborator client devices 120a and 120b apply digital makeup to the captured audio and/or video using the generated digital makeup. The collaborator client devices 120a and 120b transmit 1015 their audio and video delivery of the script portions to the director client device 110. Although not depicted, the director and collaborator client devices may communicate feedback regarding the performed portions of script and re-record according to the communicated feedback. The CCG client may include a messaging function which facilitates this communication.

The director client device 110 may select which recordings of the script readings to select for the finalized CICS and transmit 1016 the selection of the collaborator clips for the CCG system 140 to compile. The CCG system 140 compiles 1017 the final CICS. The video compiler 350 may compile the collaborator clips in a sequence corresponding to the script's order. The video compiler 350 may also generate transition scenes for compilation with the collaborator clips and/or edit the collaborator clips using the cinematography editor 340. The CCG system 140 causes 1018 the CICS to be displayed at a viewer client device 130.

Computing Machine Architecture

Figure 11:
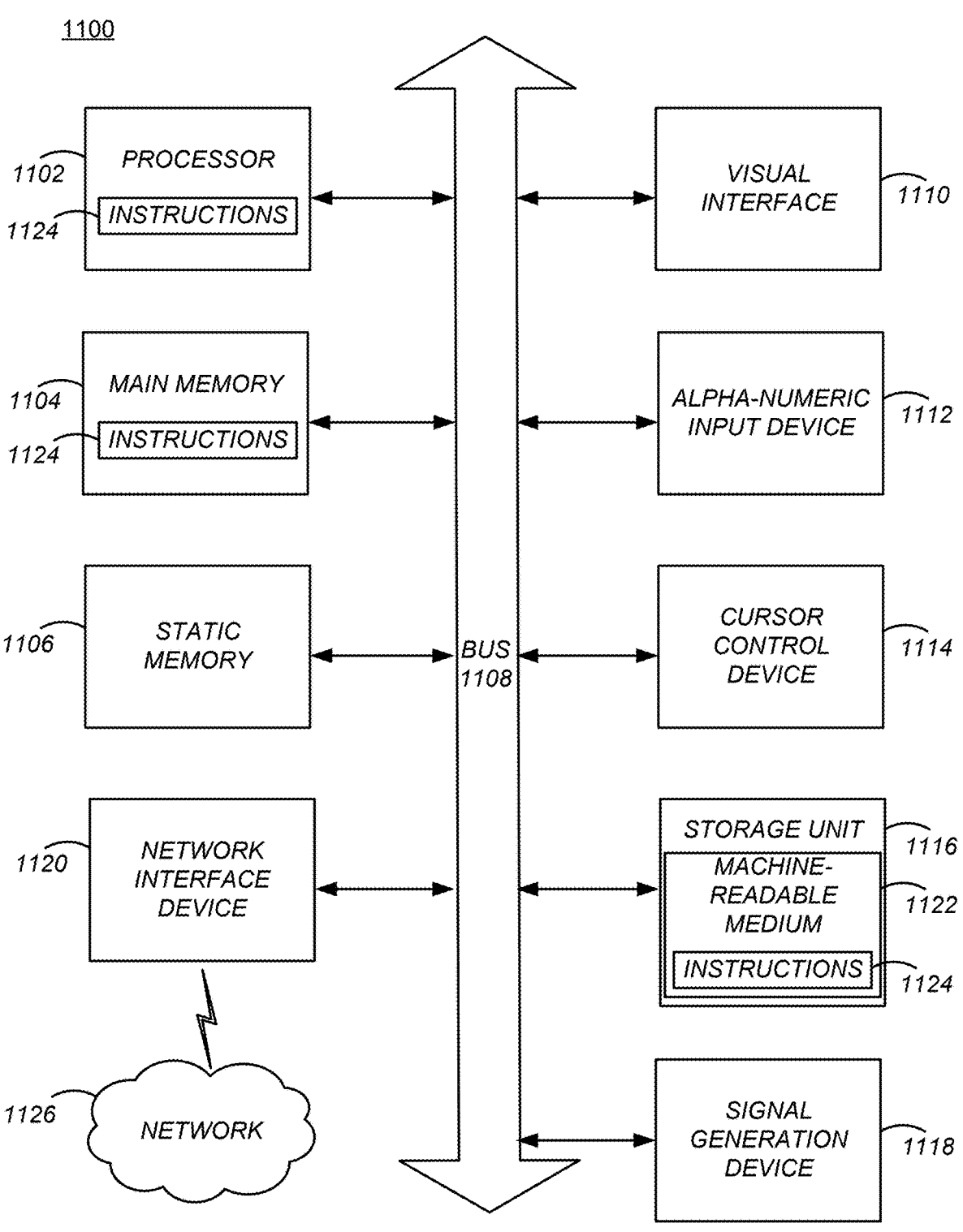
FIG. 11 illustrates a block diagram including components of a machine able to read instructions from a machine-readable medium and execute them in a processor (or controller), in accordance with one embodiment.

FIG. 11 is a block diagram illustrating components of an example machine able to read instructions from a machine-readable medium and execute them in a processor (or controller). Specifically, FIG. 11 shows a diagrammatic representation of a machine in the example form of a computer system 1100 within which program code (e.g., software) for causing the machine to perform any one or more of the methodologies discussed herein may be executed. The program code may correspond to functional configuration of the modules and/or processes described with FIGS. 1-5E. The program code may be comprised of instructions 1124 executable by one or more processors 1102. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a portable computing device or machine (e.g., smartphone, tablet, wearable device (e.g., smartwatch)) capable of executing instructions 1124 (sequential or otherwise) that specify actions to be taken by that machine. Further, while only a single machine is illustrated, the term "machine" shall also be taken to include any collection of machines that individually or jointly execute instructions 1124 to perform any one or more of the methodologies discussed herein.

The example computer system 1100 includes at least one processor 1102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1104, and a static memory 1106, which are configured to communicate with each other via a bus 1108. The computer system 1100 may further include visual display interface 1110. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 1110 may include or may interface with a touch enabled screen. The computer system 1100 may also include alphanumeric input device 1112 (e.g., a keyboard or touch screen keyboard), a cursor control device 1114 (e.g., a mouse, a trackball, a joystick, a motion sensor, or other pointing instrument), a storage unit 1116, a signal generation device 1118 (e.g., a speaker), and a network interface device 1120, which also are configured to communicate via the bus 1108.

The storage unit 1116 includes a machine-readable medium 1122 on which is stored instructions 1124 (e.g., software) embodying any one or more of the methodologies or functions described herein. The instructions 1124 (e.g., software) may also reside, completely or at least partially, within the main memory 1104 or within the processor 1102 (e.g., within a processor's cache memory) during execution thereof by the computer system 1100, the main memory 1104 and the processor 1102 also constituting machine-readable media. The instructions 1124 (e.g., software) may be transmitted or received over a network 1126 via the network interface device 1120.

While machine-readable medium 1122 is shown in an example embodiment to be a single medium, the term "machine-readable medium" should be taken to include a single medium or multiple media (e.g., a centralized or distributed database, or associated caches and servers) able to store instructions (e.g., instructions 1124). The term "machine-readable medium" shall also be taken to include any medium that is capable of storing instructions (e.g., instructions 1124) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for rendering object occlusion on an augmented reality game system executed on a mobile client through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A non-transitory computer-readable medium comprising instructions, the instructions, when executed by a computer system, causing the computer system to perform operations including:

accessing a structure parameter characterizing a genre of content;

accessing descriptive parameters characterizing a plot of the content;

generating a first prompt for a first machine learning model to request a script for the content, the first prompt specifying the accessed structure parameter and the descriptive parameters, wherein the first prompt further requests character descriptions for characters in the script, dialogue for the characters, and one or more transition scene descriptions;

receiving, as an output from the first machine learning model, the script, wherein the script comprises the dialogue for the characters and the one or more transition scene descriptions;

generating a second prompt for a second machine learning model to request digital augmentation for the characters, wherein the digital augmentation comprises one or more of a visual or audio enhancement;

receiving as an output from the second machine learning model, the digital augmentation;

transmitting, to collaborator client devices, the script and the digital augmentation, wherein:

the script is transmitted to the collaborator client devices according to accessed staffing instructions for the script; and the transmitted script appears at the collaborator client devices with respective visual indicators indicating which portions of the script are assigned to a corresponding collaborator;

receiving, from the collaborator client devices, recordings of collaborators performing the respective portions of the script, wherein the recordings include an overlay of the digital augmentation; and interleaving the recordings into a collaborative interleaved content series for transmission to a viewer client device.

2. The non-transitory computer-readable medium of claim 1, the operations further comprising:

classifying, using a third machine learning model trained using previously generated scripts and corresponding parameters used to generate the previously generated scripts, the accessed structure parameter and the accessed descriptive parameters as sufficient to generate the prompt for the first machine learning model to request the script for the content.

3. The non-transitory computer-readable medium of claim 1, the operations further comprising:

generating a third prompt for the second machine learning model to request a sound effect for the content, wherein the third prompt includes at least a portion of the script in which the requested sound effect is featured.

4. The non-transitory computer-readable medium of claim 3, the operations further comprising:

receiving audio of a user reading aloud the portion of the script; and detecting a manually produced sound effect in the audio;

wherein the third prompt includes an instruction that the requested sound effect be based on the manually produced sound effect.

5. The non-transitory computer-readable medium of claim 1, wherein the output from the second machine learning model is a first output of the second machine learning model, the operations further comprising:

receiving a shared video and a prior prompt used to generate the shared video;

modifying the second prompt using the prior prompt, wherein the modified second prompt requests an updated digital augmentation for one of the characters to have an appearance of a character in the shared video; and receiving as a second output from the second machine learning model, the updated digital augmentation.

6. The non-transitory computer-readable medium of claim 1, the operations further comprising:

generating a third prompt for a third machine learning model to request storyboard images, the third prompt specifying the character descriptions for characters in the script and the one or more transition scene descriptions;

receiving, as an output from the third machine learning model, the storyboard images; and causing the storyboard images and corresponding dialogue for the characters to be displayed.

7. The non-transitory computer-readable medium of claim 6, the operations further comprising:

receiving, from a client device, a selection one of the storyboard images; and causing a portion of the third prompt to be displayed, wherein the portion of the third prompt caused the third machine learning model to generate the selected storyboard image.

8. The non-transitory computer-readable medium of claim 1, the operations further comprising:

receiving a reference image of a desired character of the characters; and providing the second prompt and the reference image to the second machine learning model;

wherein the digital augmentation received as the output from the second machine learning model includes an appearance of the desired character that is based upon the reference image.

9. The non-transitory computer-readable medium of claim 1, the operations further comprising:

receiving cinematography instructions comprising a desired camera angle for depicting at least one of the characters, wherein the first prompt for the first machine learning model further requests a scene of the content be captured at the desired camera angle.

10. The non-transitory computer-readable medium of claim 1, wherein the digital augmentation for the characters requested in the second prompt includes an audio enhancement to a voice associated with a line of the script.

11. The non-transitory computer-readable medium of claim 10, wherein the voice is a voice of a computer-generated narrator.

12. The non-transitory computer-readable medium of claim 10, wherein the voice is a voice of a collaborator.

13. The non-transitory computer-readable medium of claim 1, the operations further comprising:

accessing collaborator characteristics;

applying the collaborator characteristics to a second machine learning model, the second machine learning model trained to determine a likelihood that a given collaborator is suited to perform a character in the script; and determining the staffing instructions for the script based on the output of the second machine learning model.

14. The non-transitory computer-readable medium of claim 13, the operations further comprising:

accessing an external database of actor characteristics, the actor characteristics describing one or more of physical appearances of actors or filmography of the actors;

accessing an external database of scripts, the actors assigned to characters in the scripts;

creating a training set based on the actor characteristics and the scripts; and training the second machine learning model using the training set.

15. The non-transitory computer-readable medium of claim 1, the operations further comprising:

generating recommendations for editing the recordings using a third machine learning model trained to determine a likelihood that the recordings satisfy preferences of a director; and generate an alternative version of one of the recordings using a diffusion model.

16. The non-transitory computer-readable medium of claim 1, the operations further comprising:

receiving an image from a collaborator client device, the image depicting an environment surrounding the collaborator client device; and generating a prompt for a generative AI video model to request a non-collaborator video clip based on the script and the image, wherein the non-collaborator video clip depicts the environment.

17. A system comprising:

a computer system; and a non-transitory computer-readable medium comprising instructions, the instructions, when executed by the computer system, causing the computer system to perform operations including:

accessing a structure parameter characterizing a genre of content;

accessing descriptive parameters characterizing a plot of the content;

generating a prompt for a first machine learning model to request a script for the content, the prompt specifying the accessed structure parameter and the descriptive parameters, wherein the prompt further requests character descriptions for characters in the script, dialogue for the characters, and one or more transition scene descriptions;

receiving, as an output from the first machine learning model, the script, wherein the script comprises the dialogue for the characters and the one or more transition scene descriptions;

generating a prompt for a second machine learning model to request digital augmentation for the characters;

receiving as an output from the second machine learning model, the digital augmentation;

transmitting, to collaborator client devices, the script and the digital augmentation, wherein:

the script is transmitted to the collaborator client devices according to accessed staffing instructions for the script; and the transmitted script appears at the collaborator client devices with respective visual indicators indicating which portions of the script are assigned to a corresponding collaborator;

receiving, from the collaborator client devices, recordings of collaborators performing the respective portions of the script, wherein the recordings include an overlay of the digital augmentation; and interleaving the recordings into a collaborative interleaved content series for transmission to a viewer client device.

18. The system of claim 17, wherein the output from the second machine learning model is a first output of the second machine learning model, the operations further comprising:

receiving a shared video and a prior prompt used to generate the shared video;

modifying the second prompt using the prior prompt, wherein the modified second prompt requests an updated digital augmentation for one of the characters to have an appearance of a character in the shared video; and receiving as a second output from the second machine learning model, the updated digital augmentation.

* * * * *